United States Patent [19]

Mizuno et al.

[11] Patent Number: 5,838,891
[45] Date of Patent: Nov. 17, 1998

[54] DATA STORAGE SYSTEM AND STORAGE MANAGING METHOD

[75] Inventors: Masahiro Mizuno; Akira Ogawa; Toshio Matsumoto; Shiro Ogura; Kazuhiko Ito; Hitoshi Yamamoto; Kazuo Ito; Hiroshi Baba, all of Tokyo, Japan

[73] Assignee: Mitsubishi Denki Kabushiki Kaisha, Tokyo, Japan

[21] Appl. No.: 611,783

[22] Filed: Mar. 6, 1996

[30] Foreign Application Priority Data

Mar. 22, 1995 [JP] Japan ..................... 7-062976

[51] Int. Cl.[6] ..................................... G06F 11/00
[52] U.S. Cl. ................... 395/182.03; 364/238.4; 395/427
[58] Field of Search ........................ 395/182.03, 182.04, 395/182.09, 183.18, 183.19, 183.2, 427, 441; 364/DIG. 1, 238.4; 371/21.1, 40.1

[56] References Cited

U.S. PATENT DOCUMENTS 5,148,432  9/1992  Gordon et al. .................. 364/243.1
5,206,943  4/1993  Callison et al. .................. 395/425
5,287,462  2/1994  Jibbe et al. ..................... 395/275
5,345,565  9/1994  Jibbe et al. ..................... 395/325
5,526,507  6/1996  Hill ............................ 395/441

FOREIGN PATENT DOCUMENTS 0125920  11/1984  European Pat. Off. .

Primary Examiner—Robert W. Beausoliel, Jr.
Assistant Examiner—Dieu-Minh Le
Attorney, Agent, or Firm—Wolf, Greenfield & Sacks, P.C.

[57] ABSTRACT

Embodiments of the present invention provide a data storage system that reduces a load of a data bus for connecting a HOST system with the data storage system. The data storage system includes a disk manager connected to the HOST system by a SCSI BUS, connected to a disk control unit by an RS PORT and connected to disk enclosures and a fan unit by a Serial BUS. The disk manager monitors operation of the disk control unit and disk enclosures and transmits results to the HOST system. In addition, control commands of the HOST system to the disk enclosures are executed via the disk manager.

22 Claims, 45 Drawing Sheets

Fig.11

| Test Unit Ready |
| --- |
| Inquiry |
| Read Capacity |
| Read |
| Write |
| Request sense |

Fig.12

| Bit<br>Byte | 7 | 6 | 5 | 4 | 3 | 2 | 1 | 0 |
| --- | --- | --- | --- | --- | --- | --- | --- | --- |
| 0 | Logical Block Address (MSB) | | | | | | | |
| 1 | Logical Block Address | | | | | | | |
| 2 | Logical Block Address | | | | | | | |
| 3 | Logical Block Address (LSB) | | | | | | | |
| 4 | Block Length (MSB) | | | | | | | |
| 5 | Block Length | | | | | | | |
| 6 | Block Length | | | | | | | |
| 7 | Block Length (LSB) | | | | | | | |

Fig. 13

| Bit<br>Byte | 7 | 6 | 5 | 4 | 3 | 2 | 1 | 0 |
|---|---|---|---|---|---|---|---|---|
| 0 | Valid | 1 | 1 | 1 | 0 | 0 | 0 | 0 |
| 1 | h'00 ||||||||
| 2 | 0 | 0 | 0 | 0 | Sense key |||
| 3 | h'00 ||||||||
| 4 | h'00 ||||||||
| 5 | h'00 ||||||||
| 6 | h'00 ||||||||
| 7 | h'00 ||||||||
| 8 | h'00 ||||||||
| 9 | h'00 ||||||||
| 10 | h'00 ||||||||
| 11 | h'00 ||||||||
| 12 | Sense code ||||||||
| 13~22 | h'00 ||||||||

Fig.14

| h'0 | No Sense |
|---|---|
| h'1 | not used |
| h'2 | Not Ready |
| h'3 | not used |
| h'4 | Hardware Error |
| h'5 | Illegal Request |
| h'6 | Unit attention |
| h'7 | Write Protect |
| h'B | Aborted Command |

Fig. 15

| Sense Code | Sense Key | |
|---|---|---|
| h'00 | h'0 | No Sense (Command completed normally without any fault in unit) |
| h'03 | h'4 | Write Fault (Under write operation, write operation did not complete normally due to H/W fault) |
| h'04 | h'2 | Not Ready (During power on time or operation, there occurred fault) |
| h'21 | h'5 | Illegal Block Address (A larger value than the address of a target block was assigned) |
| h'24 | h'5 | Invalid LUN (Assignment of logical unit is not proper) |
| h'27 | h'4 | Write Protect (Under write protection, command including write operation was received) |
| h'29 | h'6 | Power On reset, Bus Device Changed (Unit is under initial state) |
| h'40 | h'4 | RAM Error (At time of diagnosis data buffer RAM error occurred) |
| h'42 | h'4 | Power On Diag Fail (Power on self test is failed) |
| h'45 | h'4 | Select/Reselect Fail (Failure of re-selection) |
| h'48 | h'B | Initiator Detected Error (Received Initiator Detected Error Message from initiator) |
| h'49 | h'B | Inappropriate/Illegal Message (Received Illegal message for the unit) |
| h'61 | h'5 | Illegal write request (Read was requested in Write only Block) |
| h'62 | h'5 | Illegal Read Request (Write was requested in Read only Block) |

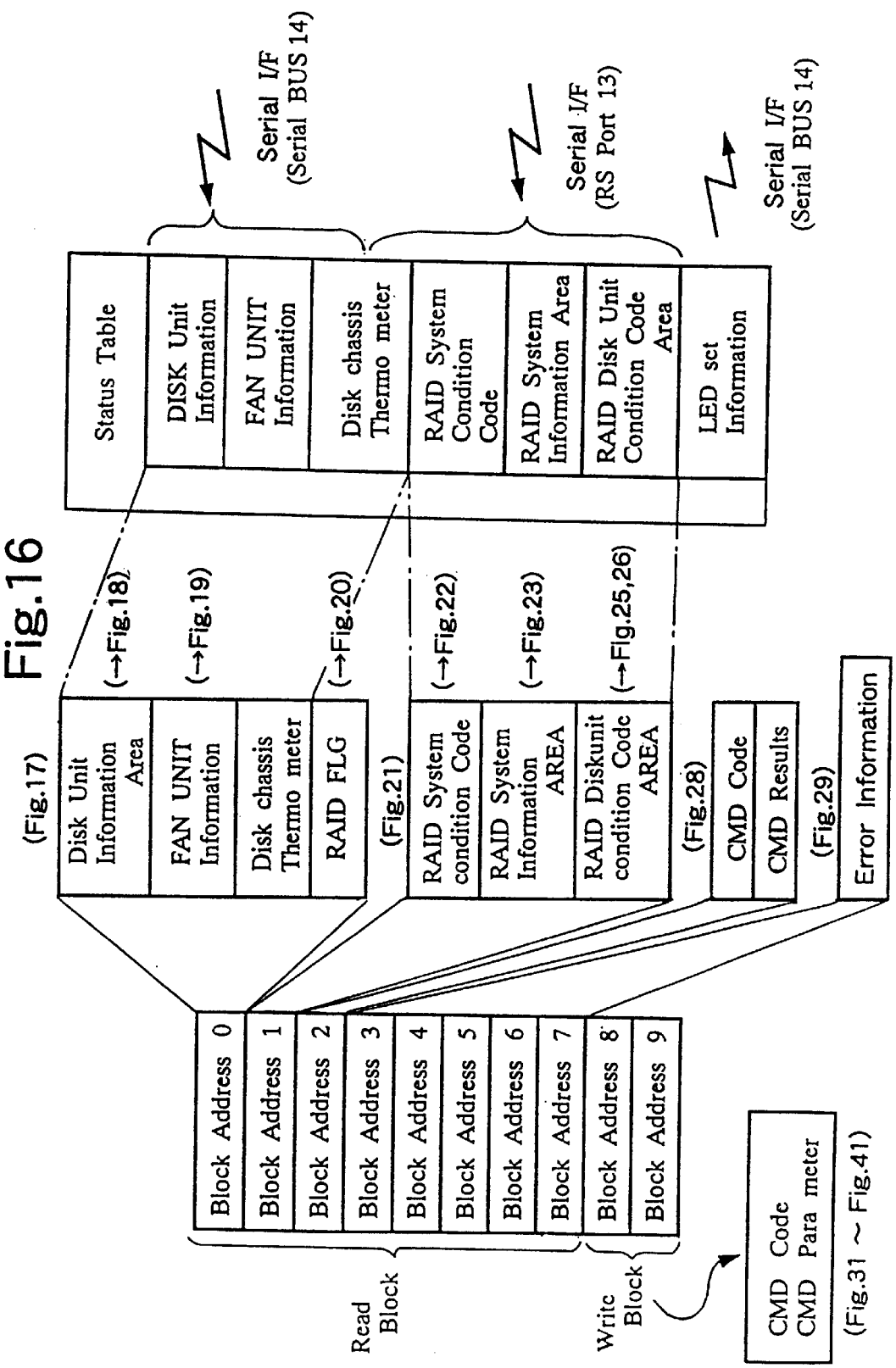

Fig.18

201: Disk UNIT Information

| 00: No exist |
|---|
| 01: Disk Unit (Swap SW OFF) |
| 11: Disk Unit (Swap SW ON) |
| 02: Dummy Unit |
| 04: SCSI BUS Extend |
| 08: Disk Manager |

Fig.19

202: FAN Unit Information

| 00: FAN Normal condition |
|---|
| 99: FAN Fault condition |

205:RAID System condition code

| 00:RAID Normal condition | Normal operation |
|---|---|
| 01:RAID Reduce condition | Degeneration due to one faulty disk |
| 02:RAID Repair condition | Reconstruction of data |
| 04:RAID Fail condition | Failure of operation due to two faulty disks |

206:RAID Level

| 01:RAID Level1 |
|---|
| 03:RAID Level3 |
| 05:RAID Level5 |

207: Disk Unit condition code

| 00:Normal condition | Normal |
|---|---|
| 02:Fail condition | Fault |
| 04:Change condition | Normal but data needs to be reconstructed |
| 08:Repair condition | Normal but data is under reconstruction |
| 10:Not exist | Disk Unit is not connected |
| 99:Don't care | Unrelated to RAID system |

| 01:RAID Level 1 |
|---|
| 03:RAID Level 3 |
| 05:RAID Level 5 |

Fig.43

| Command | function | response |
|---|---|---|
| RAID alive | Confirm connection of RAID control board | ID of connected RAID board is returned |
| Start UNIT | Initiate power ON sequence of RAID system | initiation of power on sequence or failure of initiation is informed and ID of RAID board is returned |
| Stop UNIT | Initiate stop sequence of RAID system | initiation of stop operation or failure of initiation is informed and ID of RAID board is returned |
| RAID Ready Chk | Report RAID system condition | Either of<br>RAID system Ready<br>RAID system Ready(degeneration), or<br>RAID system Fail<br>and ID of RAID board are returned |
| RAID information read | Dump each RAID information | cf. Fig.44 |
| RAID Error Dump | Dump RAID Error information | cf. Fig.45 |

Fig. 47

| Read Reg | Write Reg |
|---|---|
| bit9 | |
| bit8 | |
| bit7 | 12V ALARM |
| bit6 | |
| bit5 | 5V ALARM |
| bit4 | Swap SW ON |
| bit3 | Disk Mode3 |
| bit2 | Disk Mode2 | Swap LED ON |
| bit1 | Disk Mode1 | Fault LED ON |
| bit0 | Disk Mode0 | RUN LED ON |

| SWAP | FAULT | RUN | |
|---|---|---|---|
| OFF | OFF | ON | RUN CONDITION (Normal operation) |
| OFF | ON | OFF | FAULT CONDITION (Fault detected) |
| ON | OFF | OFF | SWAP CONDITION (Capable of removing, Insertion completes) |
| OFF | ON | ON | ACTIVE CONDITION (under Diagnosis and repairing process) |

| Bit | Read | Write |
|---|---|---|
| 7 | | |
| 6 | | |
| 5 | | |
| 4 | | |
| 3 | | |
| 2 | SWAP SW | SWAP LED |
| 1 | FAN FAULT | FAULT LED |
| 0 | | READY LED |

DATA STORAGE SYSTEM AND STORAGE MANAGING METHOD

BACKGROUND OF THE INVENTION

1. Field of the Invention

The present invention relates to a storage system of a computer and a method for managing the storage system. More specifically, the present invention reduces a load of a communication path which connects a host system and the storage system.

2. Description of the Related Art

Japanese Unexamined Patent Publication Number hei 2-236714 "Arrayed Disk Drive Mechanism System and Method" discloses an arrayed disk drive method and mechanism related to a conventional storage system of a computer. It is an object of the disclosed system and method to provide a flexible arrayed disk drive mechanism system which can construct a system logically such that all of the respective disk drive mechanisms are comprised within a completely whole disk drive mechanism, or all of the respective disk drive mechanisms are comprised within separate disk drive mechanisms, or a disk drive mechanism having a moderate stand of the above two cases.

FIG. 55 shows a block diagram of the arrayed disk drive system of the unexamined patent application. An arrayed disk drive mechanism system 100 operates as a storage unit of a computer 132. The first function of the arrayed disk drive mechanism system 100 is to read and write for a disk drive mechanism 114 from the computer 132. Hereinafter, a term "data transfer" is used to express both processes of read and write.

The arrayed disk drive mechanism system 100 has an array 112 of disk drive mechanisms 114. The array 112 is arranged to provide eleven vertical channels 116. Each of these vertical channels has six disk drive mechanisms 114.

Each vertical channel is controlled by a Small Computer System Interface (SCSI) controller 118. The SCSI controller 118 will be described hereinafter in detail. Each vertical channel 116 is accessed through a common data bus 120 and through one of the SCSI controllers 118. The data bus 120 is connected to an Error Correction and Control (ECC) engine 122.

A disk controller 124 is a main controller for the arrayed disk drive mechanism system 100. The disk controller 124 controls data transfer through the data bus 120 between the arrayed disk drive mechanism system 100 and the computer 132 from an aspect of a memory and a redundant arrangement.

A Direct Memory Access (DMA) cable 138 connects a cable drive unit 140 to the computer 132. The cable drive unit 140 is a bidirectional buffer. The cable drive unit is also connected to the data bus 120. Data from the cable 138 is transferred to the data bus 120 by the cable drive unit and data from the data bus 120 is transferred to the cable 138.

A micro processor memory 142 (also referred to as a memory buffer 142) is connected to the data bus 120 through an ECC engine 144. Data written from the computer 136 to the drive mechanism 100 is temporarily stored in the memory buffer 142 and data read from the disk drive mechanism according to a read out request from the computer is temporarily stored in the micro processor memory buffer 142.

A customer engineering panel 146 is provided. The customer engineering panel 146 is connected to the data bus 120. The customer engineering panel 146 provides a plurality of functions. One function is to provide a way of the access to the data bus 120 in order to run diagnostic software. Another function is to provide a floppy drive unit to input software for changing a logical structure of the disk drive mechanism. Another function is to run maintenance software. The disk controller 124 stores a first maintenance processor 127. The customer engineering panel 146 stores a second maintenance processor 145. The customer engineering panel 146 runs a maintenance process with the disk controller 124.

As shown in the above description, the data bus 120 connects the SCSI controllers 118, the error correction and control engine 122, the cable drive unit 140, the micro processor memory 142, the customer engineering panel 146 and the disk controller 124. Therefore, all of communication data between the computer 132 and the arrayed disk drive mechanism system 100 pass through the data bus 120. As a result, a heavy data load is given to the data bus 120.

Further, maintenance of the system is performed by the first maintenance processor 127 and the second maintenance processor 145 arranged in the customer engineering panel 146. The second maintenance processor 145 controls various types of switches and lamps for indicating the condition of the unit and monitors and controls condition of the disk included in the array 112 and interrupt operation. When two or more arrayed disk drive mechanism systems 100 are connected to the computer 132, an additional arrayed disk drive mechanism system 100 need not have a disk controller 124. One initial disk controller 124 can be used for a plurality of the arrayed disk drive mechanism systems 100. However, each of the additional arrayed disk drive mechanisms needs its own second maintenance processor 145 for monitoring and controlling condition of the disk included in the array 112 and interrupt operation.

Therefore, when an arrayed disk drive mechanism system 100 is added, a customer engineering panel 146 must be added for each arrayed disk drive mechanism systems 100.

Since a conventional arrayed disk drive mechanism system is configured as has been described, all communication data are concentrated on the data bus. Hence, there is a problem that load of the data bus is increased.

When an array disk drive mechanism system 100 is added, a customer engineering panel 146 must also be added requiring further expense. When an arrayed disk drive mechanism system 100 is added, since only one data bus exists, the load problem of the data bus is further compounded.

SUMMARY OF THE INVENTION

It is an object of embodiments of the present invention to solve the above-identified problems. It is a further object of embodiments of the present invention to separate a data path for accessing an arrayed disk drive mechanism system from a data path for monitoring the condition of the data storage system so that the load of the data bus, which was a problem of the conventional arrayed disk drive mechanism system, is reduced.

Another object of embodiments of the present invention is to provide a disk system in which the customer engineering panel need not be added when an additional disk system is added.

According to one aspect of this invention,

A data storage system accessed from a host system may include:

(a) a storage unit for storing data having first and second interfaces, coupled to the host system through the first interface;

(b) a storage manager that manages the storage unit having first and second interfaces, coupled to the host system and communicating with the host system through the first interface, and coupled to the storage unit and communicating with the storage unit through the second interface.

According to another aspect of this invention,

A storage managing method of a system having a host system coupled to a data storage system, the data storage system having a storage unit and a storage manager, the method may include the steps of:

(a) transferring data between the storage unit and the host system through a first communication path coupled to the storage unit, the storage manager and the host system;

(b) transferring managing information between the storage manager and the host system through the first interface;

(c) monitoring and controlling operation of the storage unit by the storage manager through a second communication path coupled to the storage unit and the storage manager.

According to another aspect of this invention,

A data storage system for providing data storage for a host system, the data storage system may include:

a storage unit that stores data of the host system;

a storage manager that monitors and controls data storage in the storage unit;

first means for transferring data between the host system, the storage unit and the storage manager;

second means for transferring data between the storage unit and the storage manager, the data transferred by the second means being related to management information of the storage unit;and third means for transferring data between the storage manager and the storage unit, the data transferred by the third means being related to status and control information of the storage unit.

Other objects features, and advantages of the invention will be apparent from the following description when taken in conjunction with the accompanying drawings.

BRIEF EXPLANATION OF THE DRAWINGS

In the drawings,

FIG. 11 shows a command supported by a SCSI BUS according to the first embodiment of the present invention;

FIG. 12 shows a Read Capacity data of a SCSI command;

FIG. 13 shows a Request Sense data of the SCSI command;

FIG. 14 shows a Sense Key of the Request Sense;

FIG. 15 shows a Sense Code of the Request Sense;

FIG. 16 shows a specification of a SCSI block;

FIG. 18 shows a code being set based on the unit condition;

FIG. 19 shows a code being set based on the fan condition;

FIG. 43 shows a specification of the RS Command;

FIG. 47 shows a capacity of data transferred by a DATA/OUT phase in accordance with the Serial BUS;

DESCRIPTION OF PREFERRED EMBODIMENTS

Embodiment 1.

In this embodiment of the present invention, components of a data storage system and specification of the components will be described.

In this embodiment a disk unit is provided as an example of a storage apparatus. However, the storage apparatus of this invention is not limited to the disk unit but can consist of one of a number of apparatus that stores data. In this embodiment, there is shown a case where access to the disk unit from the HOST system is performed. Accordingly, it is assumed that the storage is a disk enclosure and a storage control unit is a disk control unit.

Figure 1:
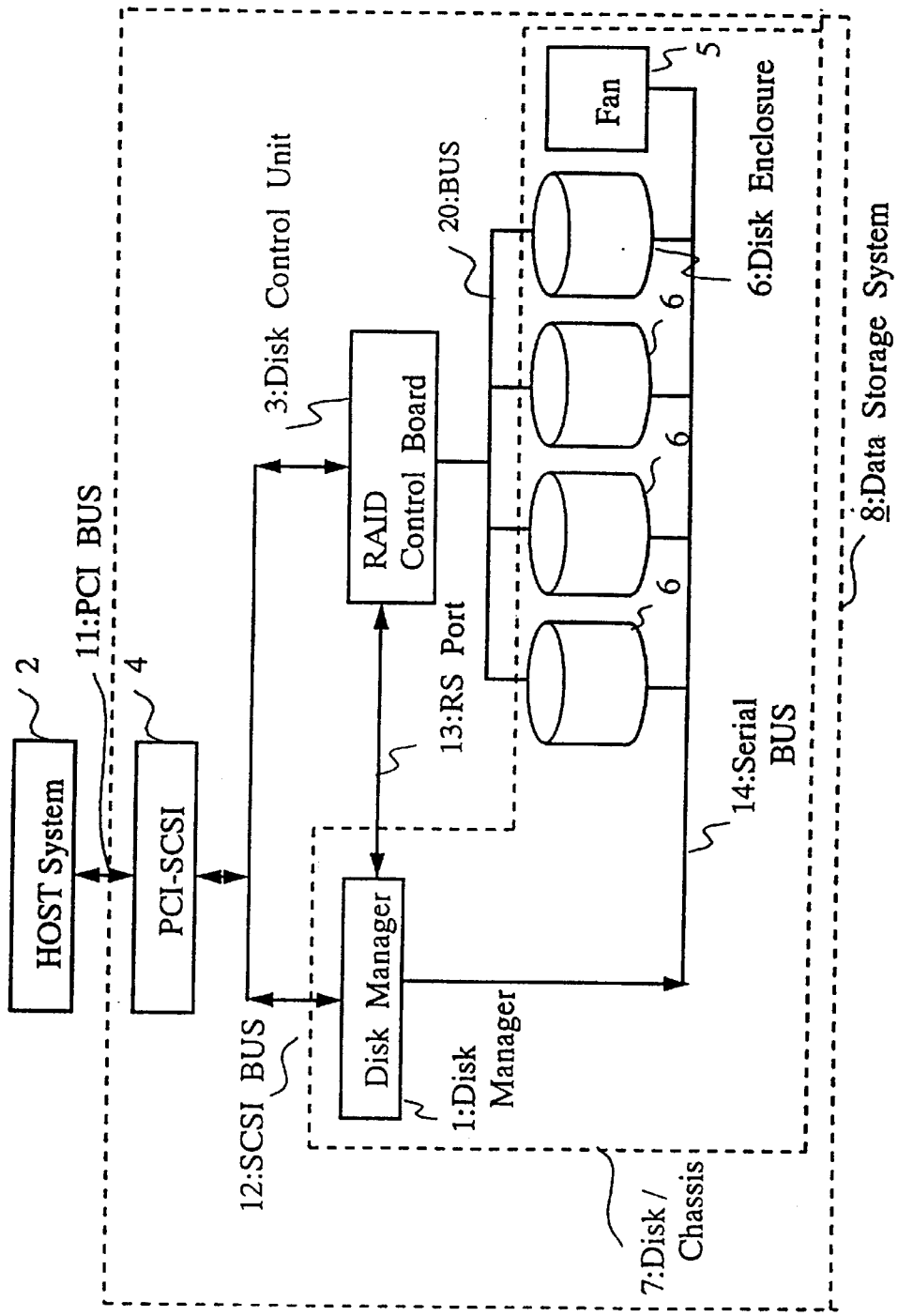
FIG. 1 shows a system configuration of an example of a data storage system according to a first embodiment of the present invention.

FIG. 1 shows a system configuration of an example of a data storage system in accordance with this embodiment of the present invention.

In FIG. 1, a disk manager 1 is connected to a HOST system 2 through a SCSI BUS 12 and through a PCI BUS 11. Data of the PCI BUS is converted to SCSI BUS data by the PCI-SCSI 4. Further, the HOST system 2 is connected to a disk control unit 3 through the SCSI BUS 12. The disk manager 1 is connected to the disk control unit 3 through an RS Port 13 to monitor and control the operation condition of the disk control unit. The disk control unit 3 is connected to a plurality of disk enclosures 6 through a BUS 20. The BUS 20 is a bus which accesses to the disk unit and transmits and receives data with the disk control unit 3. For example, the BUS 20 can be a SCSI BUS. Further, the disk manager 1 is connected to a plurality of disk enclosures 6 and a fan unit 5 through a Serial BUS 14 and monitors and controls the operation condition of the plurality of disk enclosures 6 and the fan unit 5.

The disk chassis 7 houses the disk manager 1 and the plurality of disk enclosures 6. The disk chassis 7 is shown in detail in FIGS. 2A and 2B.

In FIG. 1, the data storage system 8 is composed of the disk manager 1, the plurality of disk enclosures 6, the fan unit 5 and the PCI-SCSI 4.

The PCI-SCSI 4 is used to connect the data storage system 8 and the HOST system 2 because an interface of the disk unit uses the SCSI in general.

The SCSI BUS can connect a maximum of 8 units and the SCSI2 can connect a maximum of 16 units.

For communication between the disk manager 1 and the disk control unit 3, an RS Port 13 is used. The RS Port is used so that a cable and connectors can be made relatively small in scale. The RS Port 13 is provided to connect a line of the disk manager and a line of a RAID Control Board, which is one example of the disk control unit 3.

The Serial Bus 14 can connect many disks and allows bidirectional communication. In addition, even when the number of disks increases, the Serial BUS is relatively inexpensive and can accommodate a number of signal lines.

As has been described, the data storage system 8 uses the SCSI BUS and the RS Port to provide communication between the disk manager 1 and the disk control unit 3. As another example, a Serial BUS of an SSA or a P1394 can be used.

Figure 2:
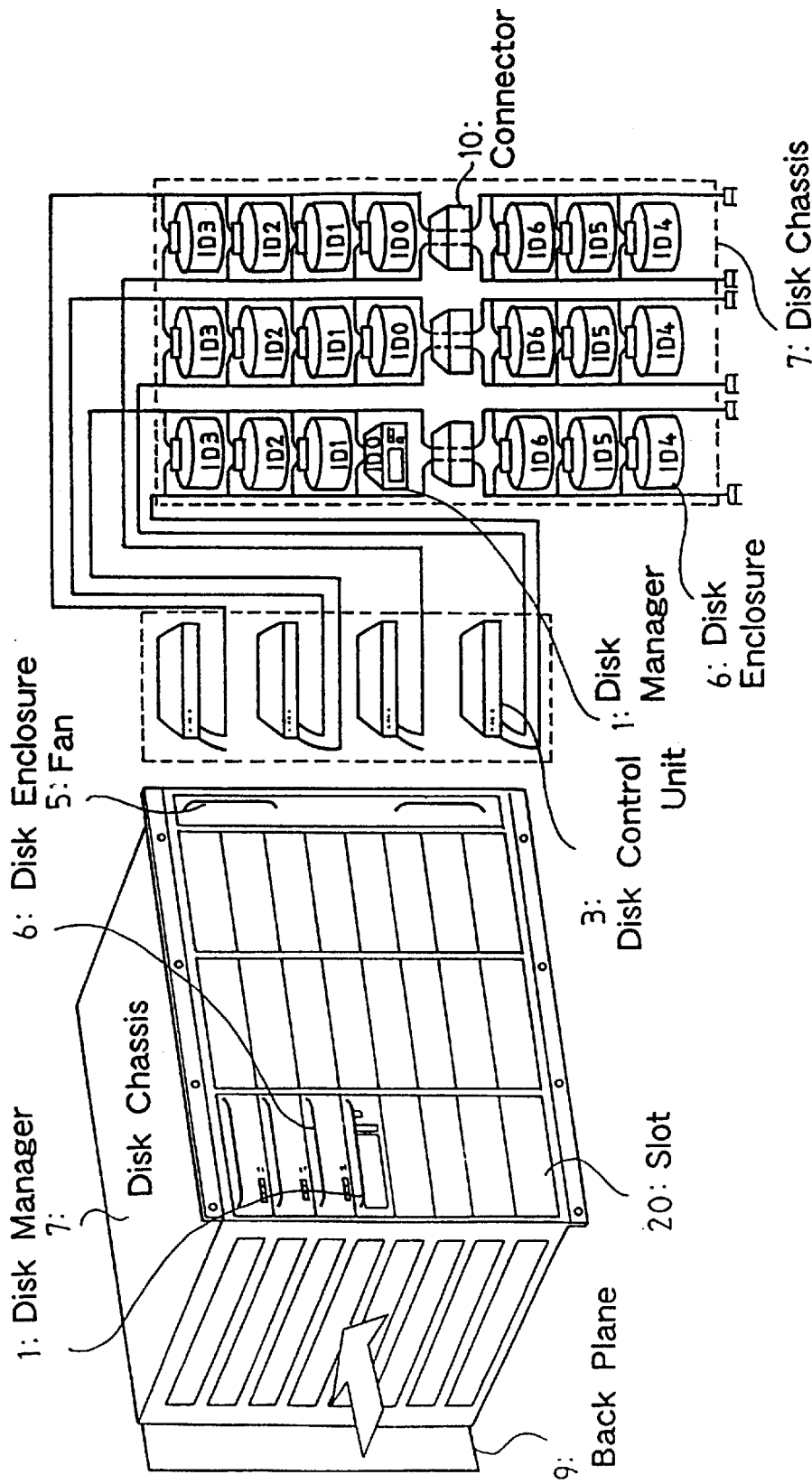
FIG. 2A shows an example of a disk chassis according to the first embodiment of the present invention.
FIG. 2B shows an illustrative example of the interconnection of units within the disk chassis of FIG. 2A.

FIGS. 2A and 2B show an example of the disk chassis. The disk chassis 7 of FIG. 2 provides 24 slots 20, 3 slots in a row by 8 slots in a column. The disk chassis also includes a slot to mount the fan unit 5 as shown in FIG. 2A. A back plane 9 is provided behind the disk chassis 7. The back plane 9 includes signal lines of the Serial BUS 14 to connect the disk manager 12 mounted in one of the slots 20, the disk enclosure 6 and the fan unit 5. One disk manager 12 exists in the data storage system 8. Hence, among 24 numbers of slots, the disk manager 12 is mounted in one slot. In FIGS. 2A and 2B, the disk manager 12 is mounted on the fourth slot from the top of the left side. In addition, in FIG. 2B, a connector 10 is mounted in each of the fifth slots from the top of the disk chassis 7. Disk enclosures 6 are mounted in the other slots 20. Instead of the connector 10, a disk enclosure 6 can be mounted in each of the slots occupied by the connectors 10. The disk manager 1 and the disk enclosures 6 mounted in the slots ID0 to ID6 comprise a group in a vertical direction. Further, the disk control unit 3 is the RAID Control Board in the present embodiment. The RAID Control Board connects the disk enclosure through the SCSI. In FIG. 2B, four disk control units 3 are connected to the disk chassis 7 through the back plane 9 by a communication line. The slots 20 provided by the disk chassis 7 are divided into three groups in the vertical direction. Each disk control unit 3 connects to two vertical groups to provide redundancy.

Figure 3:
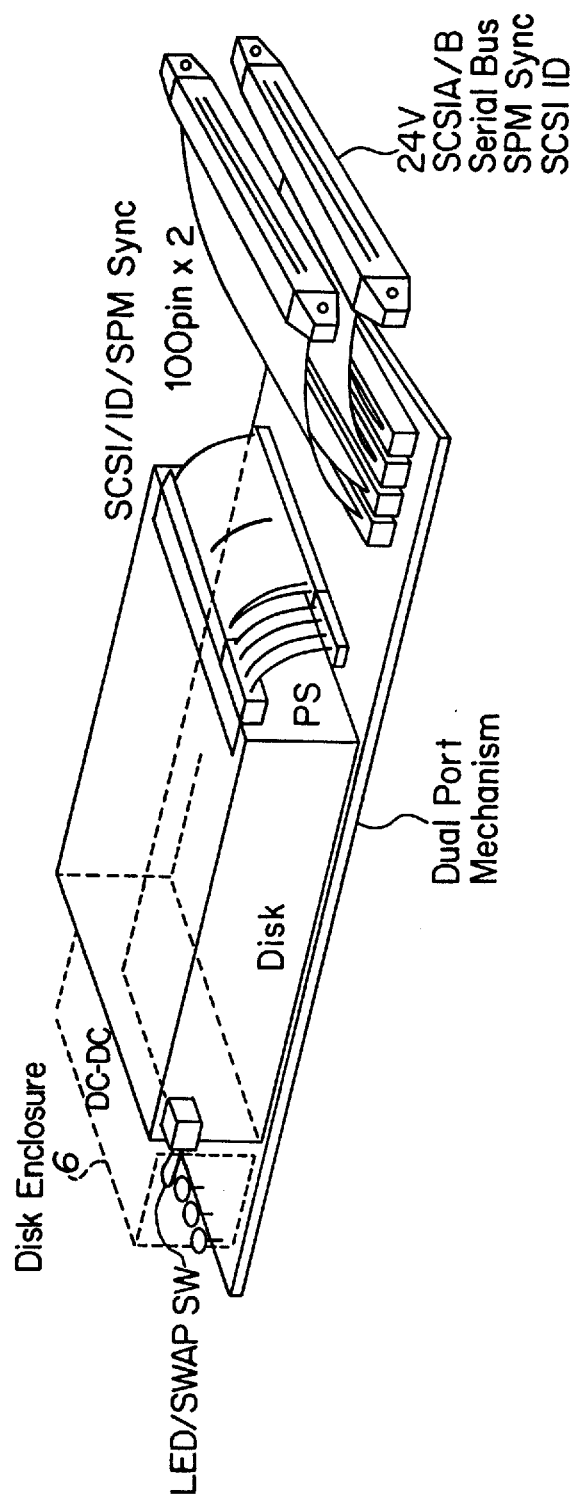
FIG. 3 shows a structure of a disk enclosure according to the first embodiment of the present invention.

FIG. 3 shows a structure of one of the disk enclosures 6.

Figure 4A:
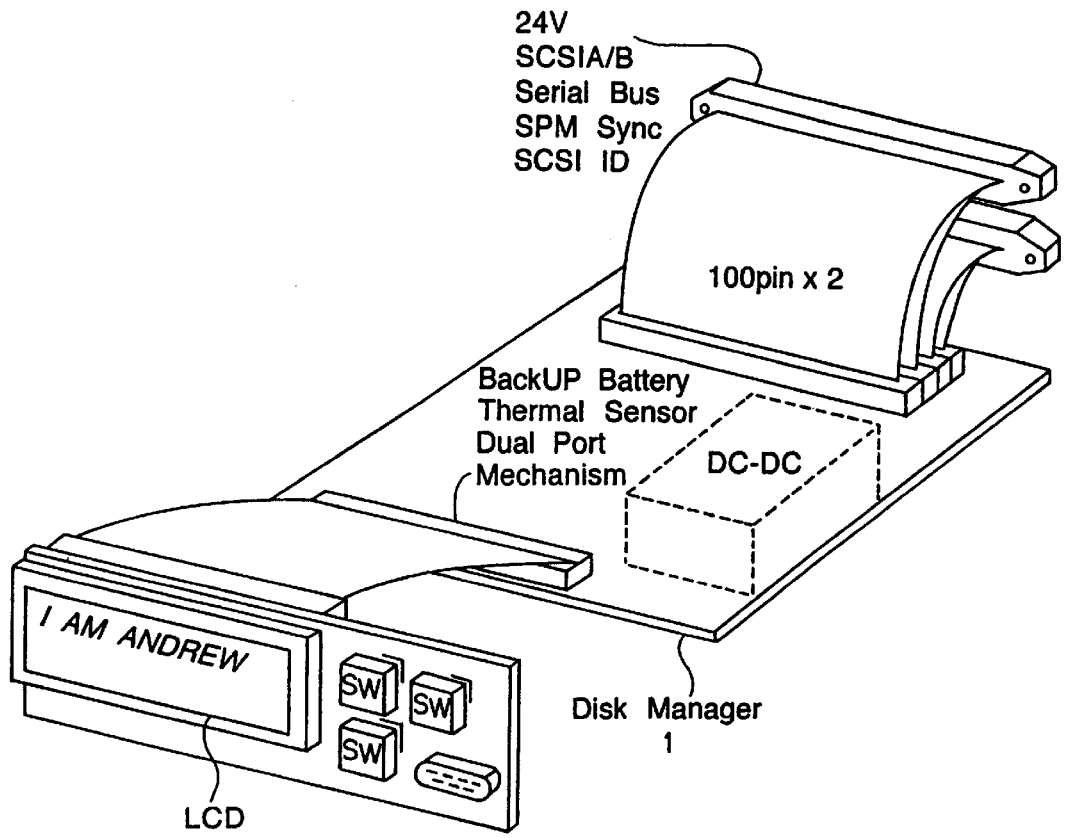
FIG. 4A shows a structure of a disk manager according to the first embodiment of the present invention.
Figure 4B:
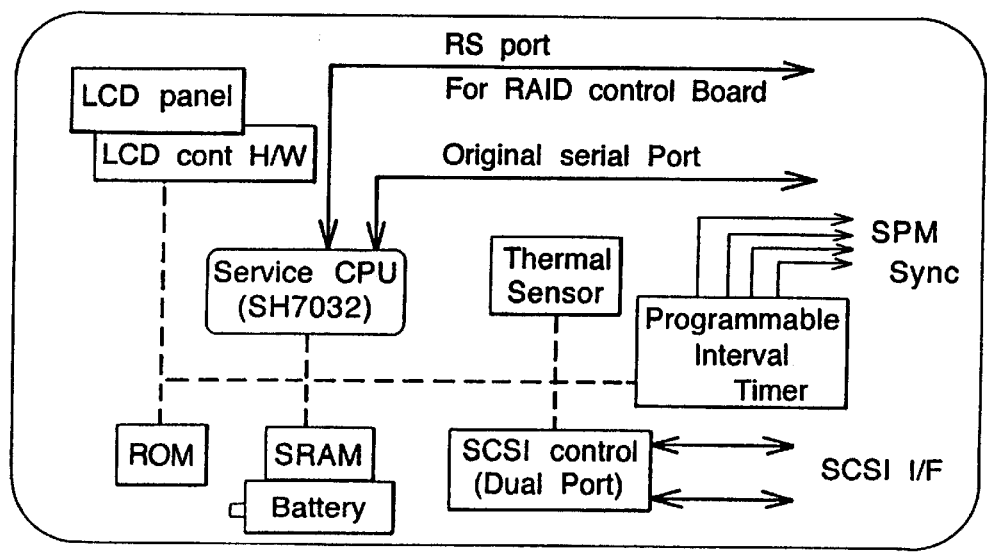
FIG. 4B shows a structure of the disk manager according to the first embodiment of the present invention.

FIGS. 4A and 4B show a structure and a composition of the disk manager 1.

Figure 5:
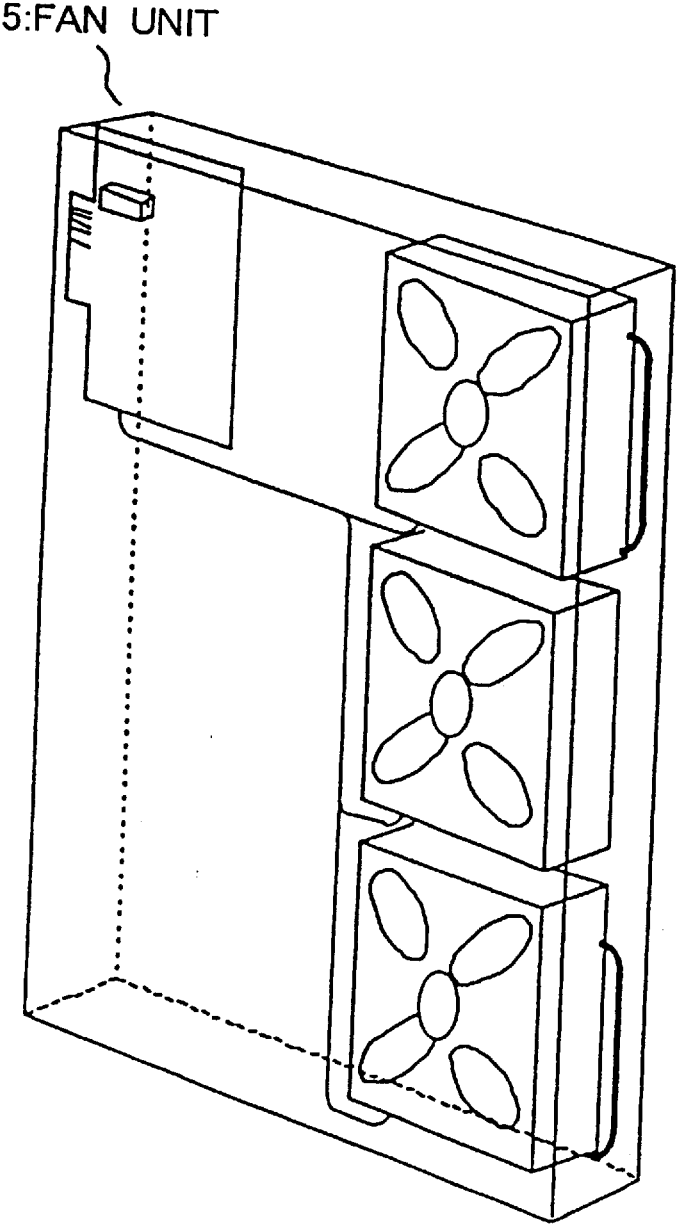
FIG. 5 shows a structure of a fan according to the first embodiment of the present invention.

FIG. 5 shows a structure of the fan unit.

Following is a brief description of the data storage system according to this invention with reference to FIGS. 1 to 5.

The disk chassis 7 is a rack structure for providing each slot 20. Each slot is electrically connected by the back plane 9. On the slot of the disk chassis 7, the disk enclosure 6 for recording data, the fan unit 5 for cooling and the disk manager 1 for diagnosis are mounted.

As shown in FIG. 3, the disk enclosure 6 is composed of a 3.5 inch fixed disk, a dual port mechanism and a DC-DC convertor (called DC-DC) which generates voltages of 12V and 5V from a voltage of 24V. The disk enclosure 6 further includes a SWAP SW which is handled at the time of exchanging the disk enclosure 6 and a Light Emitting Diode (LED) for indicating a condition of the disk enclosure.

As shown in FIG. 5, the fan unit 5 provides a plurality of fans for providing a required amount of cooling air.

As shown in FIG. 4, the disk manager 1 provides the SCSI and is connected to a HOST system by using the same connection interface as with the disk control unit 3.

The disk manager 1 is connected to the disk enclosure 6 in each slot of the disk chassis 7 by the serial interface.

Next, the detailed structure of the disk control unit 3 will be described.

The disk control unit 3 is mounted external to the disk chassis 7.

The disk control unit 3 is a RAID board dedicated to RAID LEVEL 1, 3 or 5 corresponding to a standard configuration, a mirror configuration or a dual port configuration.

The disk control unit 3 provides a maximum of 5 SCSI BUSes to the disk chassis 7. In the example shown, one SCSI BUS connects to a maximum of 4 disk units, and therefore, 5 SCSI BUSes can connect to a maximum of 20 disk units. The configuration is set by a dedicated target driver via the disk manager 1.

Next, the detailed structure of the disk chassis 7 will be described.

The disk chassis 7 has a structure of 3 rows and 8 columns of slots.

One disk chassis includes one fan unit and one disk manager and a maximum of 23 disk enclosures. The disk chassis connects to the disk control unit 3 by means of the SCSI BUS via the back plane 9. The disk chassis can be connected in series up to two disk chassis.

One SCSI BUS connects 4, 7 or 14 disk units. Therefore, the following connect patterns can be selected. Here, it is assumed that one disk is allocated for the disk manager.

(a) when one disk chassis is used,
4 disks/SCSI BUS×6 SCSI BUSes=24

(b) when one disk chassis is used,
7 disks/SCSI BUS×3 SCSI BUSes=21

(c) when two disk chassis are used,
14 disks/SCSI BUS×3 SCSI BUSes=42

Next, a detailed structure of the back plane 9 will be described. The back plane 9 has the following signal lines and connectors.

The disk manager 1, the disk enclosure 6 and the fan unit 5 are all connected to the back plane 9.

(1) power source

From a power source not shown in the figures, a voltage of 24V is supplied to the back plane via a cable connector and to the disk manager 1, the disk enclosure 6 and the fan unit 5 via a power line.

(2) SCSI BUS

12 SCSI BUSes are provided in the back plane. The connectors for connecting to the disk control units 3 are all arranged behind the fan unit.

(3) slot address/SCSI ID

A proper address is allocated to each slot and communication with the disk manager 1 is performed using the address. Among these addresses, 4 bits are allocated to a SCSI ID. When a disk enclosure 6 is inserted into the disk chassis 7, the SCSI ID is automatically set.

The SCSI ID can be automatically changed based on connection of the cable.

(4) serial interface

A Serial BUS having four signal lines connects to the disk manager 1, each of the disk enclosures 6, and the fan unit 5. Power is provided to each unit from the disk manager 1.

(5) unit connection connector

The disk enclosure 6 and the disk manager 1 respectively use two 100 pin connectors with a guide. The fan unit 5 uses a card edge connector.

(6) the other signals

Signal lines are used to supply a spindle synchronous signal (SPM Sync). The disk enclosures having SCSI ID 0/1/2/3 are regarded as one group. One signal line for SPM sync is provided for each group. This signal is used only in the RAID configuration. A synchronous cycle of each group of the disk enclosure having the same SCSI ID is transmitted to the disk manager 1. Then, the disk manager 1 outputs a synchronous pulse.

Next, a detailed structure of the disk enclosure 6 will be described.

The disk enclosure 6 provides a Dual port mechanism as a basic structure.

The disk enclosure 6 has rails on both sides and a handle on the front for extracting the disk enclosure from the slot. Two 100 pin connectors with a guide are used for connecting to the back plane 9. Installation of the disk enclosure 6 in the disk chassis 7 is loose so that stress between the disk enclosure 6 and the disk chassis 7 will be absorbed.

The disk enclosures are powered using the voltage of 24V supplied from the system. Voltages of 12V and 5V necessary for the internal circuits of the disk enclosures are generated in the DC-DC converter of the disk enclosure 6.

Power for the LED, for detection of switch SW pushdown, for transmission of model type is supplied from the disk manager 1 via the back plane 9 to the disk enclosure 6.

Following are exchange procedures. The user pushes down the SWAP SW of the disk enclosure 6 and requests the software provided in the HOST system 2 in advance to exchange. The software detects handling (change) of the SWAP SW by polling the disk manager 1 via the dedicated target driver. When the software detects the SWAP SW push-down, if the disk enclosure 6 is exchangeable, the LED indicates or displays the message "exchangeable". Referring to the indication or the display, the user extracts the disk enclosure 6.

Output of the SWAP SW is latched and reset at the time of change of the LED (i.e., completion of detection of SWAP SW push down by the software).

Stop of the spindle motor of the disk unit is executed by the software issuing STOP UNIT command or by the DC-DC converter in the disk enclosure 6 by stopping supply of the voltage of 12V. In case of a RAID configuration, when the RAID control unit detects a fault of the disk, spindle motor stops based on STOP UNIT command.

Next, a detailed structure of the disk manager 1 will be described.

The disk manager 1 has the same external size as the disk enclosure 6 and can be mounted in any slot of the disk chassis 7. The disk manager 1 communicates with each of the disk enclosures 6 and the fan unit 5 mounted to the disk chassis 7 through the back plane 9. The disk manager 1 communicates with the disk control unit 3 (RAID control unit) through the Serial BUS 14. The disk manager 1 is connected to the SCSI BUS 12 and the software of the HOST system in advance exchanges information via the target driver.

The disk manager 1 has a status table loaded in memory and polls each unit of the disk enclosure 6 and the fan unit 5 at regular intervals and updates the contents of the status table continuously. The status table exists in the Static Random Access Memory (SRAM) shown in FIG. 4B. A detailed structure of the status table is shown later in FIG. 16. When an inquiry comes via the SCSI from the HOST system, the status table is transferred to the HOST system. When the indication of the LED of a disk enclosure 6 needs to be changed, the disk manager 1 rewrites the status table.

The value after changing the status table is transferred to the disk enclosure 6 and is indicated on the LED.

It is possible to execute the operation by using a panel of the disk manager 1 as a stand alone unit. The panel of the disk manager 1 has a Liquid Crystal Display (LCD) indicator (16 letters×2 lines) and three switches (SW), as shown in FIG. 4 and it is possible to perform each kind of operation according to a dialogue pattern. Each kind of operations is, for example, ON/OFF of each disk unit (disk enclosure 6) connected to the disk control unit 3, prompting input of the exchange operation of the disk enclosure 6 and the fan unit 5, YES/NO input for confirming a stop (power source OFF) operation of each disk connected to the disk control unit 3, prompting input of the change of the RAID configuration, and so on.

The disk manager 1 includes a temperature sensor (Thermal Sensor of FIG. 4) and sets a detected temperature as a representative temperature of the disk chassis 7. By using this value, control of the fan is carried out. Further, the disk manager 1 has a buzzer, which can provide an alert in response to abnormal condition. The Static Random Access Memory (SRAM) is backed up by a battery so that the information stored therein is non-volatile. Then, log information can remain when the 24V power source is turned off.

Further, the disk manager 1 controls the following information by using a program stored in the Read Only Memory (ROM).

(1) disk enclosure control
turn on of RUN/RDY/SWAP LEDs
read of a DC-DC fault signal (1 bit)
read of a device type (4 bit)
read of the SWAP SW (1 bit)
(2) control of the fan for cooling
read of FAN FAULT (1 bit)
read of the rotation state of the FAN (2 bits)
(3) control of the RAID control unit
read of RAID LEVEL/RANK (Table)
read of a disk fault position (Table)
initiation of recovering and read of recovering status (4 bits)

Figure 6:
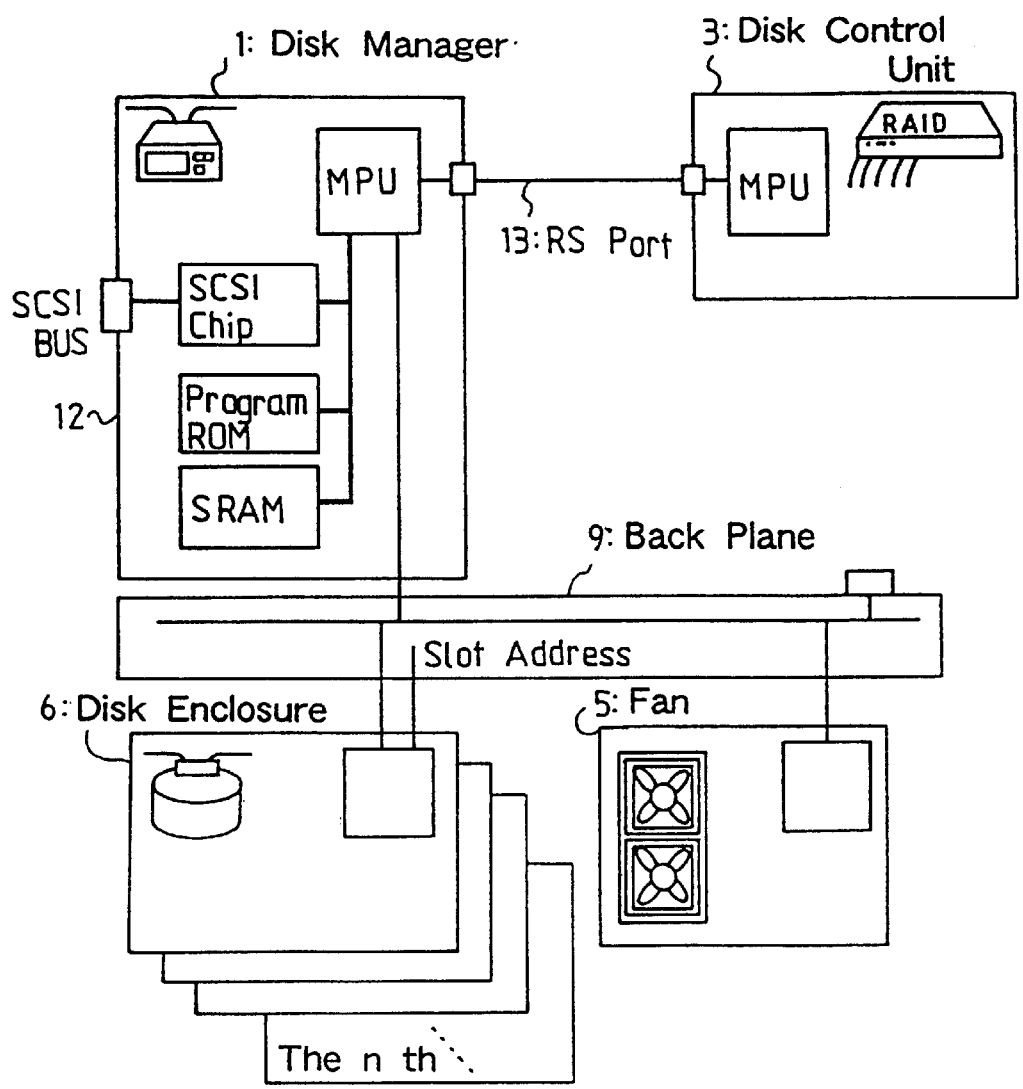
FIG. 6 shows a connect configuration of the disk manager according to embodiment 1.
Figure 7:
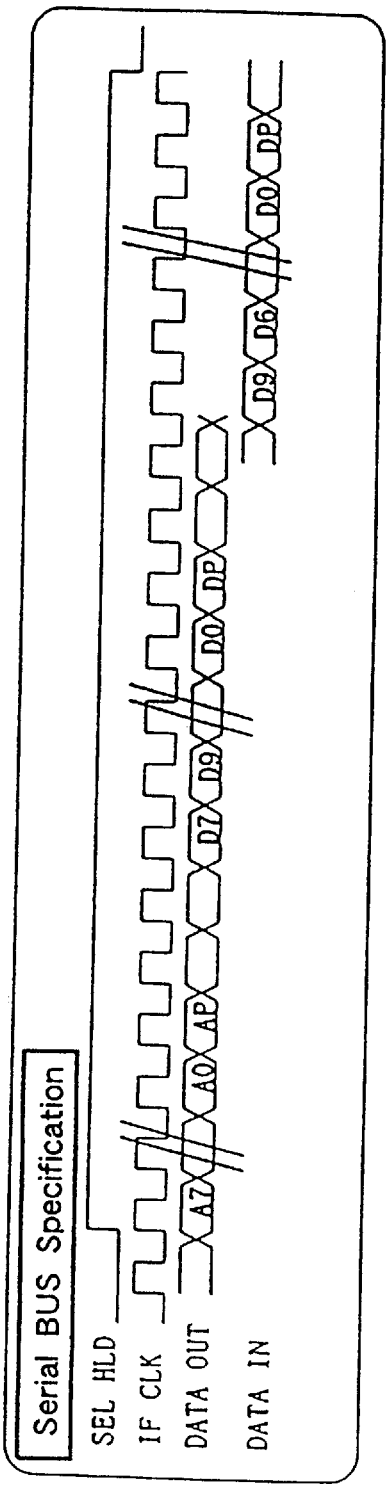
FIG. 7 shows a cycle of a control signal of a Serial BUS according to the first embodiment of the present invention.

A detailed description of the Serial BUS 14 will now be provided with reference to FIG. 6 showing the disk manager connection structure and FIG. 7 showing a cycle of the control signal of the Serial BUS.

First, the Serial BUS between the disk manager 1 and the RAID control board, which is an example of the disk control unit 3, will be described.

The RAID control board is connected to the disk manager 1 using a Serial BUS with addressing capability. In this embodiment, as shown in FIG. 6, the disk manager 1 and the RAID control board are connected through an RS Port carrying the Serial BUS. Communication between the RAID control board and the disk manager is performed by an asynchronous system using a multi processor mode. A signal line to transmit the multi processor bit is added and the receiving node has a proper ID in this asynchronous system. Communication is classified into the ID transmission cycle (multi processor bit ON) and DATA transmission cycle. The transmitting node is the disk manager 1 and the receiving node is the RAID control board. Data transmission from the receiving node to the transmitting node is executed within a fixed time interval, immediately after the receiving node receives data. Thus, bidirectional communication is actualized.

The Serial BUS among the disk manager 1, the disk enclosures 6 and the fan unit 5 will be described below.

The disk manager 1, each of the disk enclosures 6 and the fan unit 5 are connected by the Serial BUS. As shown in FIG. 7, the Serial BUS is composed of the following four signals, a SEL-HLD signal for indicating that communication is being implemented (if not effective, it indicates Reset), an IF-CLK signal providing timing for transmitting address or data, a DATA-OUT signal for transferring address or data of the disk enclosure 6 and the fan unit 5 from the disk manager 1, and a DATA-IN signal for transferring data to the disk manager 1 from each of the disk enclosures 6 and the fan unit 5.

FIG. 7 shows a cycle of the control signal. In accordance with FIG. 7, when the SEL-HLD signal is Hi, the IF-CLK, the DATA-OUT and the DATA-IN are effective. The IF-CLK signal is a clock having a cycle of more than 0.5 $\mu$s, and data is transmitted and received based on a falling edge of this IF-CLK signal. The DATA-OUT signal is a signal transmitted from the disk manager 1 and outputs data, in which the initial 8 bits indicates slot Address and the next 10 bits indicate data to be set in the unit of the disk enclosure 6 and the fan unit 5. The DATA-IN signal is a signal to be transmitted from each of the disk enclosures 6 and the fan unit 5 and outputs 10 bits of data to the disk manager 1 after output of the 10 bits of the DATA-OUT signal. Communication is performed mainly by the disk manager 1. Address transmission, data transmission and data reception is always performed in turn. Each of the disk enclosures 6 has a proper address provided by the back plane 9. Only when a value received by the address transmission agrees with the proper address, the disk enclosure 6 receives the data and returns its own data.

The structure of the fan unit 5 will be described in detail.

The fan unit is configured as shown in FIG. 5, with a DC-DC converter to convert 24V into 12 V, the fans and the disk manager connection circuit. The fan unit contains three 120 by 120 cm$^2$ fans. Connection of the fan unit with the back plane 9 is accomplished using a cartridge type connector. The fan unit is exchangeable but it does not include a SWAP SW or an LED indicator.

To control noise from the fans, the number of rotations of the fan is controlled in two stages. Under an ordinary condition, the fan rotates slowly. The disk manager 1 controls rotation of the fans based on data received from the temperature sensor. By communicating with the disk manager 1, the fan unit executes the following operations.

fan rotation control
fan alarm communication when any of the fans stops
fault detection of the fan power source Next, the disk connection structure according to embodiments of this invention will be described. It is possible to select a case where one SCSI BUS connects 4 disks, or a case where one SCSI BUS connects 7 or 14 disks, in case that it is desirable to have more storage capacity as previously described.

Furthermore, as a method for connecting, Dual Port connection, a Mirror (Duplex) connection and a RAID connection may be used.

Figure 8:
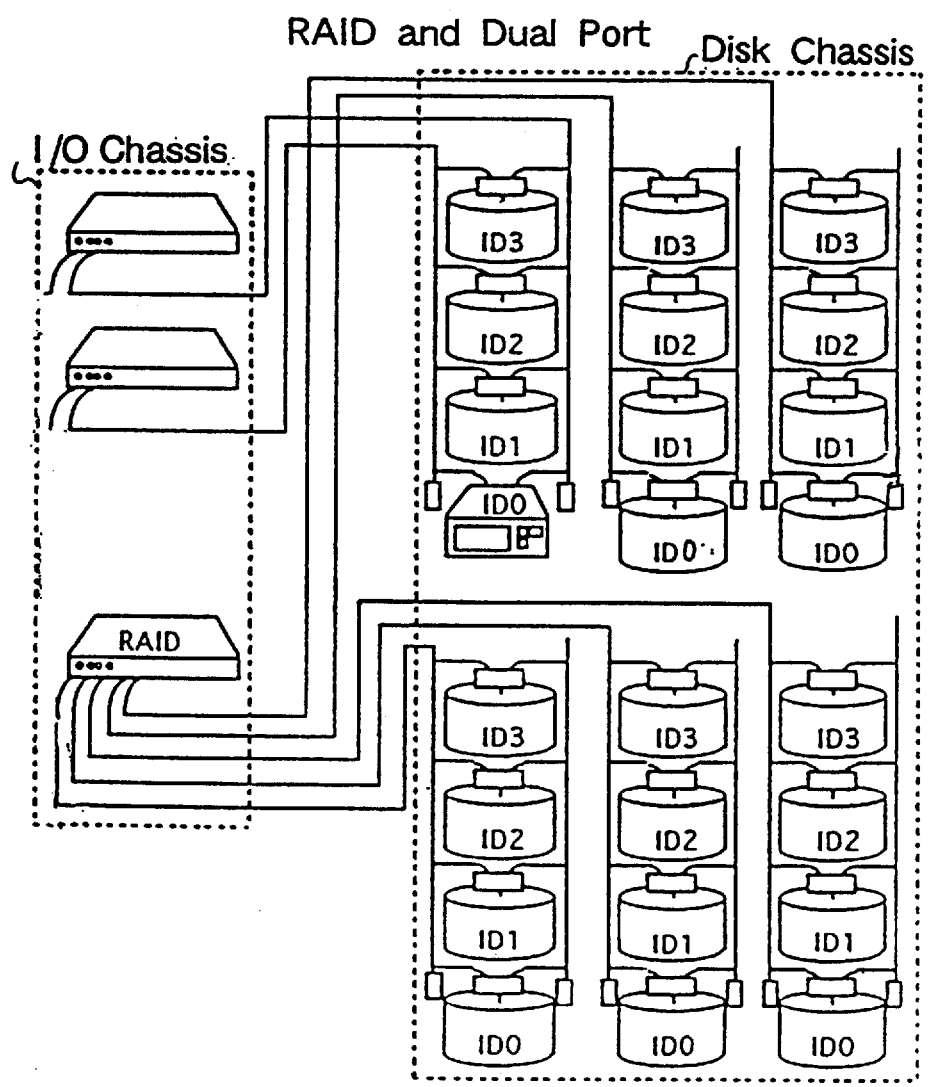
FIG. 8 shows an example of a connect configuration of the disk according to the first embodiment of the present invention.

Since a dual port mechanism is mounted in each disk enclosure as a standard specification, by connecting the disk control unit as shown in FIG. 8, the dual port connection can be realized. A competitive control of a file access is managed by software. In ordinary operation, only a main system is used. When a fault occurs, access to the main system stops and only the access to the obedient system is used.

Figure 9:
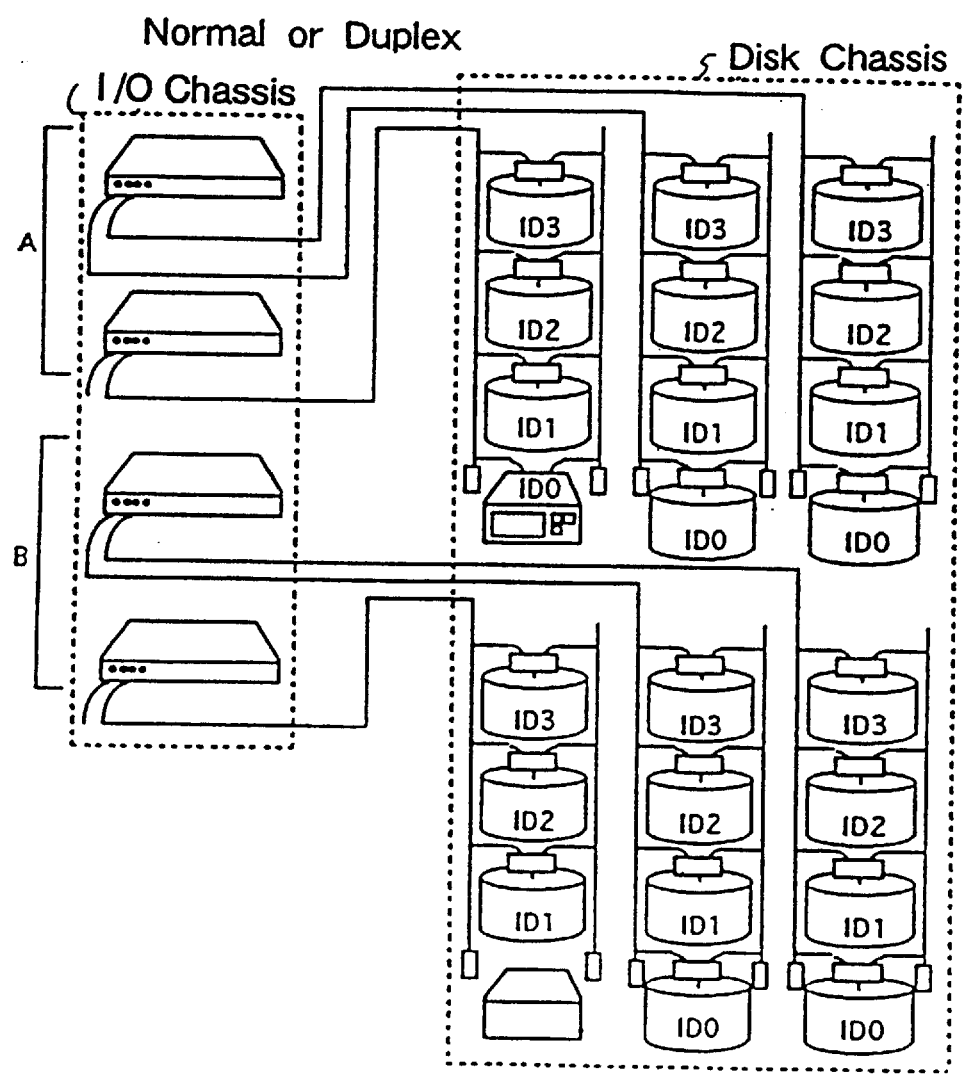
FIG. 9 shows an example of a connect configuration of the disk according to the first embodiment of the present invention.

The Mirror (Duplex) connection is realized using the connectivity shown in FIG. 9. It is possible to access the main system and the obedient system simultaneously. Data is read from the system which provides the data more quickly and data is written for both systems simultaneously.

The RAID connection is realized using the interconnection shown in FIG. 8. A maximum structure is 5 disks in width and 4 disks in depth (the number of disks is 20). The RAID LEVEL can be set at 1, 3, or 5. A logical division is possible up to four by using a Logical Unit Number (LUN). These settings can be performed by rewriting the RAID configuration information of the disk manager. The RAID configuration information is in SRAM as shown in FIG. 4B. The RAID configuration information will be described in detail later with reference to FIG. 37. Until this setting is performed, only a LUN=0 can be accessed from the software.

Figure 10:
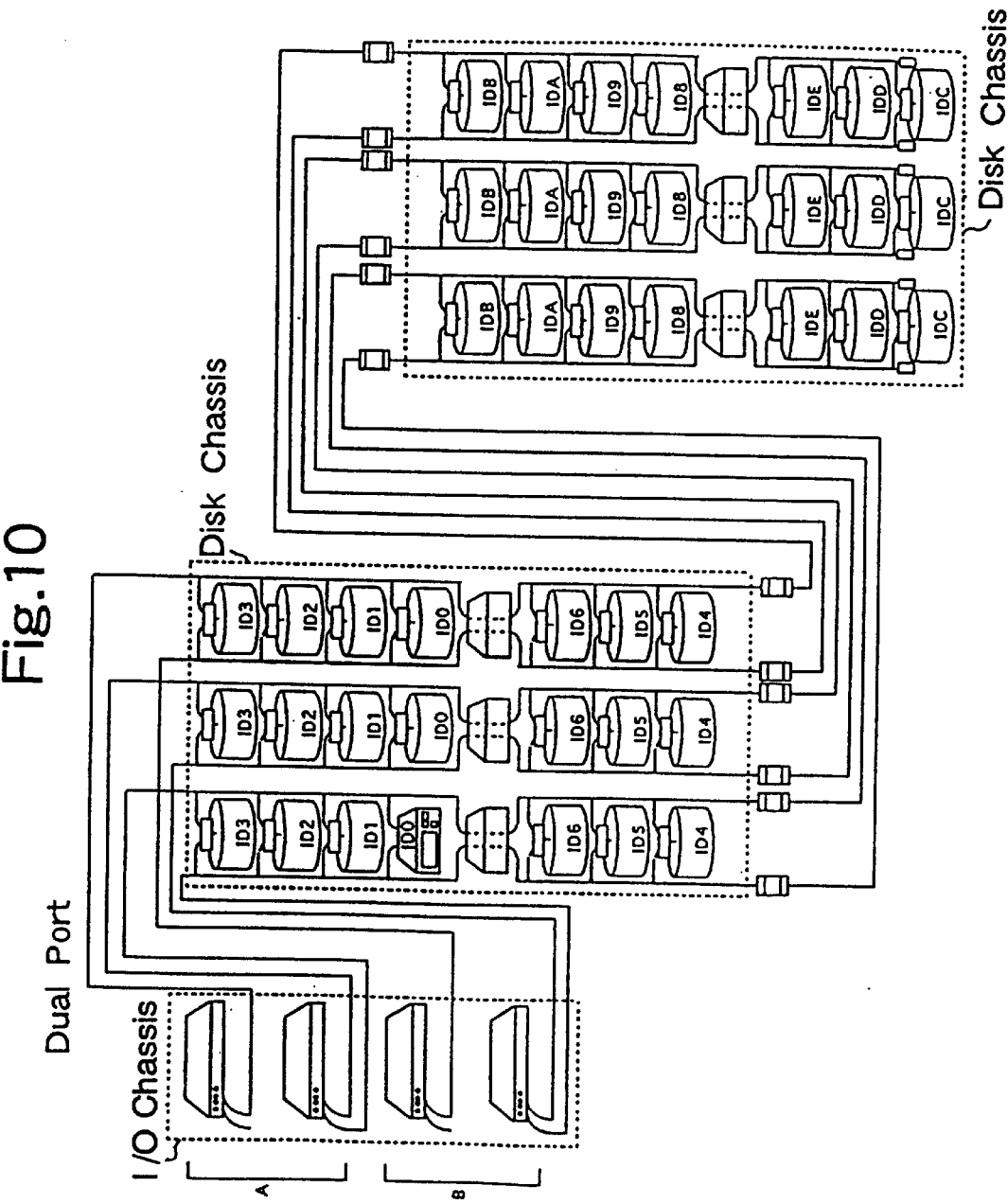
FIG. 10 shows an example of a connect configuration of the disk according to the first embodiment of the present invention.

FIG. 10 shows the Dual Port connection when two disk chassis are connected in series. When two disk chassis are connected, a SCSI2 which can connect a maximum of 16 units is used.

Hereinafter, there is described a case in which the data storage system according to this embodiment has the RAID and Dual Port connection.

The operation of the data storage system when the power source of the disk manager 1 is turned on will now be described.

When the power source is applied, the DC-DC converter of the disk manager 1, each of the disk enclosures 6 and the fan unit 5 starts and supplies the necessary power to each unit.

After a power on reset procedure, the disk manager 1 performs auto-diagnosis. For an LED test, the LED of each of the disk enclosures 6 is turned on and off. After that, each connected unit is searched and configuration information is initialized. The initialization is performed by the software. Meanwhile, the disk manager 1 outputs UNIT ATTENTION/NOT READY for the SCSI BUS. The disk manager 1 outputs READY after completing the initialization. Hereinafter, when the Read Command to the status table is received from the HOST system, the status table is transferred to the HOST system. When the Write Command to the status table is received from the HOST system, the status table is updated and the indication of the corresponding LED is changed. When the Write Command to the status table is received from the host system, in case of RAID configuration, change such as LEVEL/RANK is performed.

Each of the disk enclosures 6 waits for a START UNIT command from the HOST system under UNIT ATTENTION/NOT READY status. The START UNIT commands are issued in turn for a plurality of disk enclosures 6.

In case of RAID configuration, when the shut down operation is performed, the disk manager 1 receives a stop request from the dedicated target driver. The stop operation is performed via a serial line for the RAID control board.

A specification of the disk manager 1 will now be described below.

The disk manager 1 is a unit included in the data storage system and manages a whole data storage system.

As shown in FIGS. 4A and 4B, a SCSI BUS, an RS Port, and a Serial BUS (original BUS) provide the interface of the disk manager 1.

The outside interface of the data storage system is only the SCSI BUS. The RS Port and the Serial BUS serve as the inside interfaces of the data storage system.

The function of each interface is as follows.

(1) SCSI BUS (Dual Port)
setting the interface with the software of the HOST system to be the SCSI BUS, and reporting condition of the data storage system and so on to the HOST system.

(2) RS Port
effective when the RAID System is connected and used to control the RAID System and collect various types of information.

(3) Serial BUS
used to collect information of the disk enclosure and the fan unit connected to the data storage system.

A specification of the SCSI BUS, the RS Port and the Serial BUS will be described, hereinafter.

Initially, the SCSI BUS is explained.

Response of the disk manager 1 is executed in accordance with the Read/Write of the SCSI Block.

FIG. 11 indicates a list of commands to be supported through the SCSI BUS in this system.

Because "Test Unit Ready", "Inquiry", "Read Capacity" and "Request sense" among the six commands of FIG. 11 have a similar function of the commands in a general SCSI BUS, in this embodiment, only outlines of the four commands will be shown.

The command "Test Unit Ready" checks the condition of the disk manager 1. When the disk manager 1 is under a Ready state and possible to be accessed from the HOST system which issued the "Test Unit Ready" command, "GOOD Status" is reported to this command. When the disk manager 1 is under a Not Ready state, "CHECK CONDITION" is reported to this command.

The command "Inquiry" transfers Inquiry data of the disk manager 1 to the HOST system.

The command "Read Capacity" transfers the capacity of the disk manager 1 and the information as to the data block size to the HOST system. FIG. 12 shows Read Capacity data.

In FIG. 12, the Read Capacity data is 8 bytes and four bytes from the 0th byte to the third byte show a logical block address. Four bytes from the fourth byte to the seventh byte are used to indicate a block length.

A command "Read", having the data block indicated in a "logical block address" field of the COMMAND Descripter Block (CDB) as a head address, reads out the consecutive logical data blocks of the number of blocks indicated in "a number of transfer blocks" field and transfers them to the HOST system.

A command "Write", having the data block indicated in the "logical block address" field of the CDB as a head address, writes data transferred from the HOST system on the consecutive logical data blocks of the numbers of blocks indicated in "the number of transfer blocks" field.

A command "Request sense" transfers request sense data, which indicate the internal status of the disk manager 1, to the HOST system. The length of the request sense data from the disk manager 1 is 23 bytes. FIG. 13 shows Request sense data.

In FIG. 13, four bits from the third byte, the 0th bit to the third bit show Sense Key and 1 byte of the 13th byte shows the Sense code. FIG. 14 shows a list of Sense keys and FIG. 15 shows a list of Sense codes.

Next, the SCSI Block will be explained.

The SCSI Block is an accessible data unit from the SCSI BUS and it exists in the SRAM 5 of the disk manager 1. A specification of the SCSI Block is shown in FIG. 16. Read Blocks are accessed by the "Read" command. Write Blocks are accessed by the "Write" command. In Read Blocks/ Write Blocks, data are all described in an ASCII code (hereinafter, alphanumerical numbers shown in the figures are all ASCII codes). A Block size of each of the SCSI Blocks is 512 byte/Block. The Read Blocks are eight blocks of Block addresses 0 to 7 and the Write Blocks are two blocks of Block addresses 8 to 9.

Figure 17:
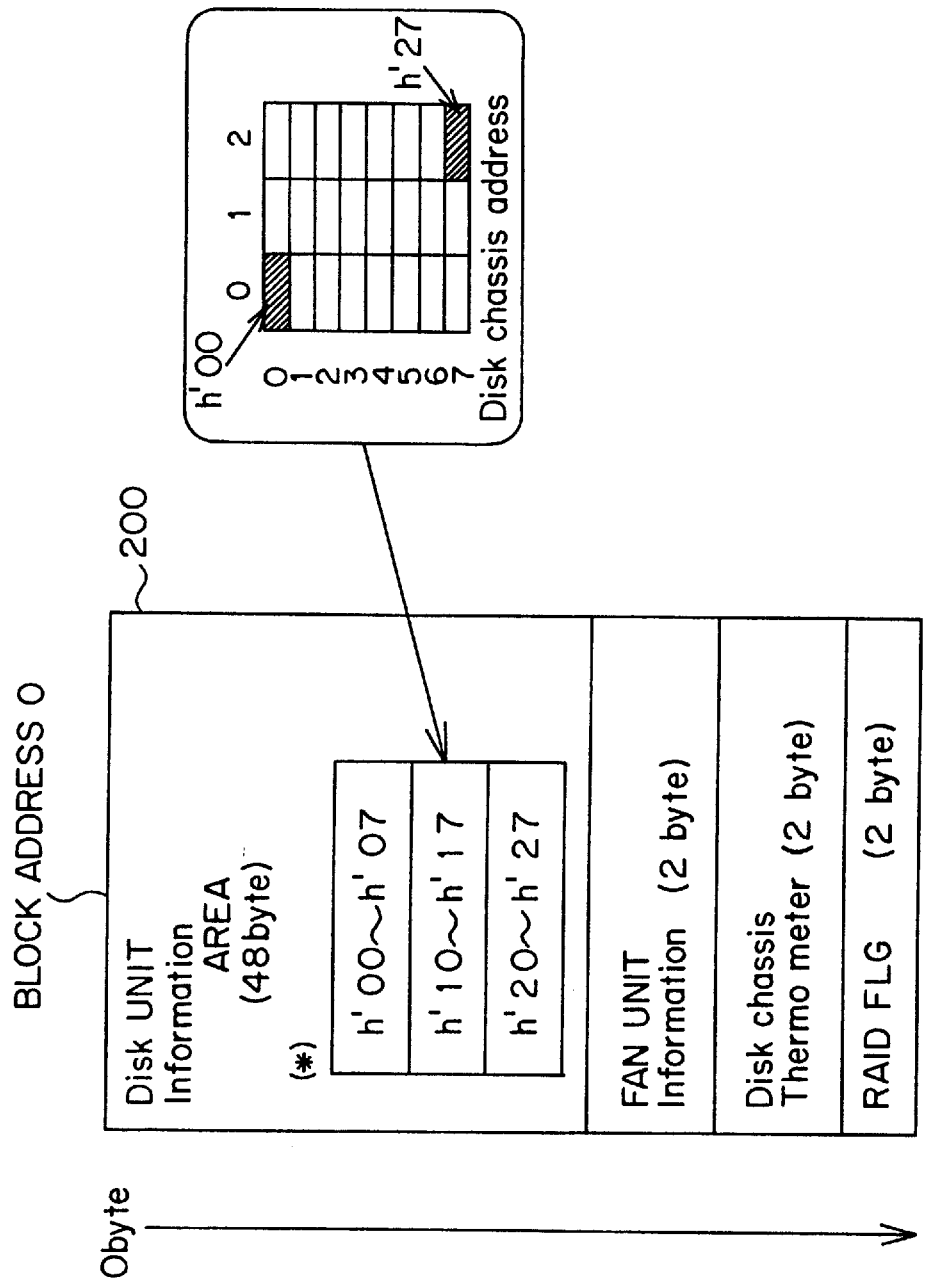
FIG. 17 shows an image of a Block Address 0 of the SCSI block.

As shown in FIG. 16, a detailed explanation of a block having Block Address 0 is shown with reference to FIG. 17. Further detailed explanation will be shown with reference to FIGS. 18 to 20. A block having Block Address 1 is described in detail with reference to FIG. 21. Referring to FIGS. 22, 23, 25, 26 and 27, the further detailed explanation will be shown.

Figure 28:
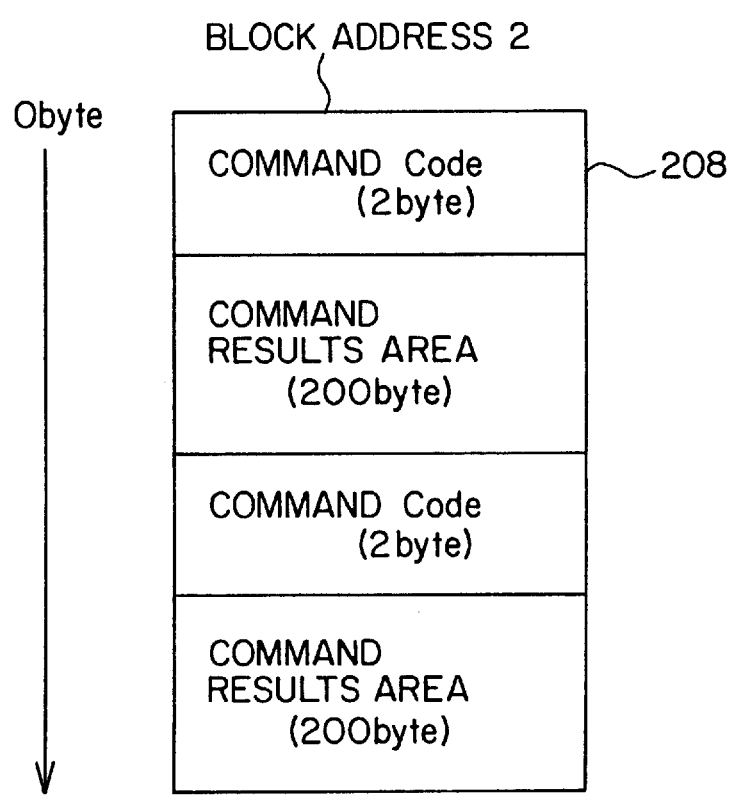
FIG. 28 shows an image of a Block Address 2.

A detailed explanation of a block having Block Address 2 is shown, with reference to FIG. 28.

Figure 29:
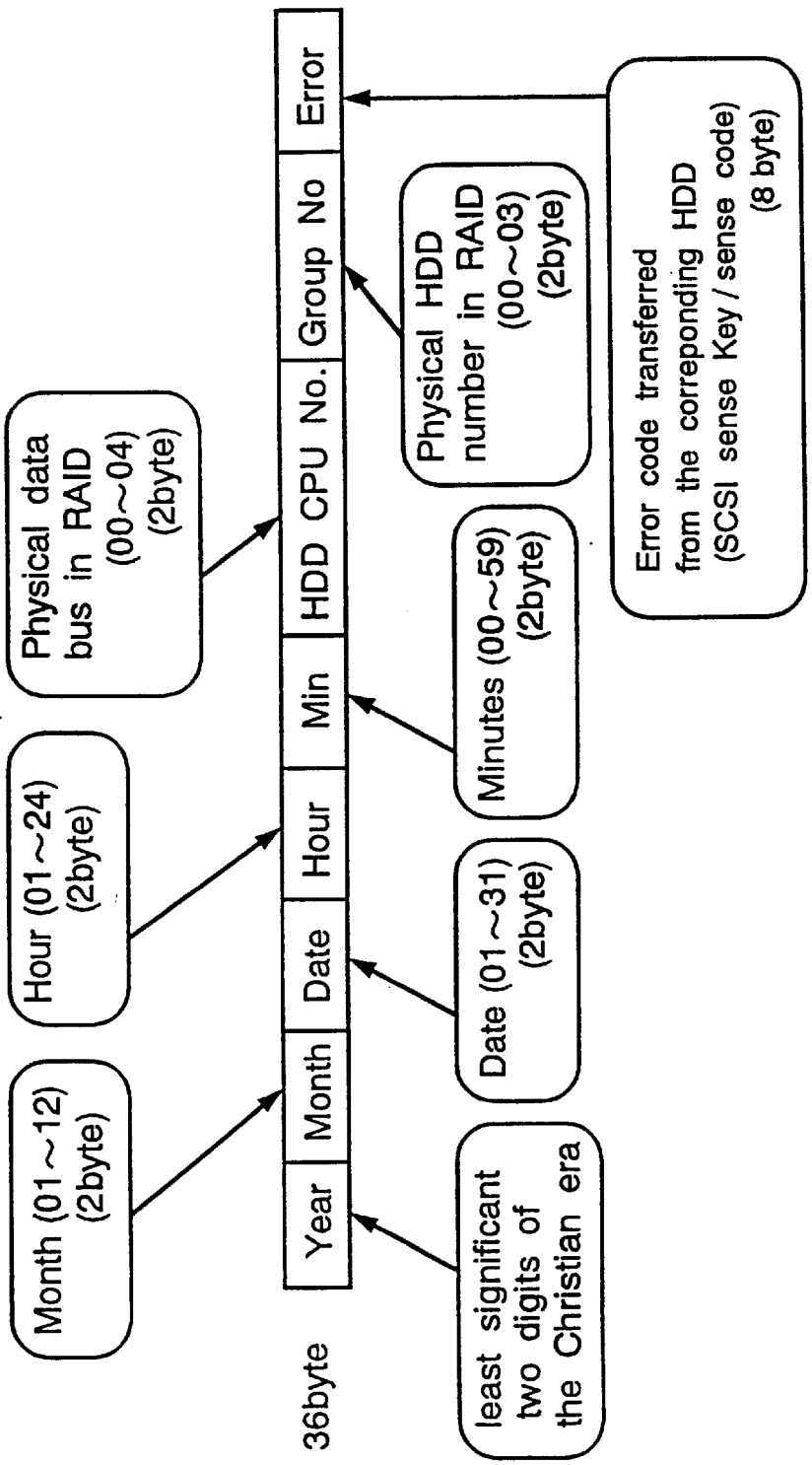
FIG. 29 shows an image of error information of Block Address 3 to 7.

A detailed explanation of blocks having Block Addresses 3 to 7 is shown, with reference to FIG. 29.

A detailed explanation of blocks having Block Addresses 8 and 9 is shown, with reference to FIGS. 30 to 41.

As to the status table, there is shown an explanation, with reference to FIG. 16.

Figure 20:
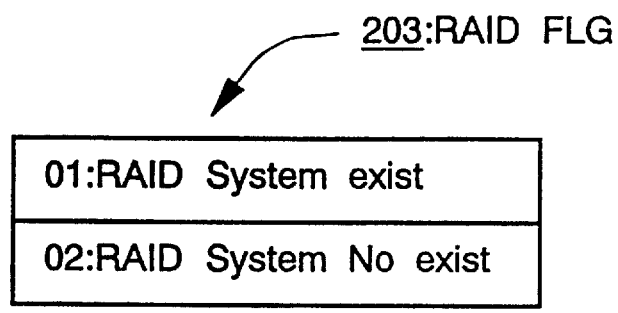
FIG. 20 shows a code being set based on the RAID configuration condition.
Figures 22, 23, 24:
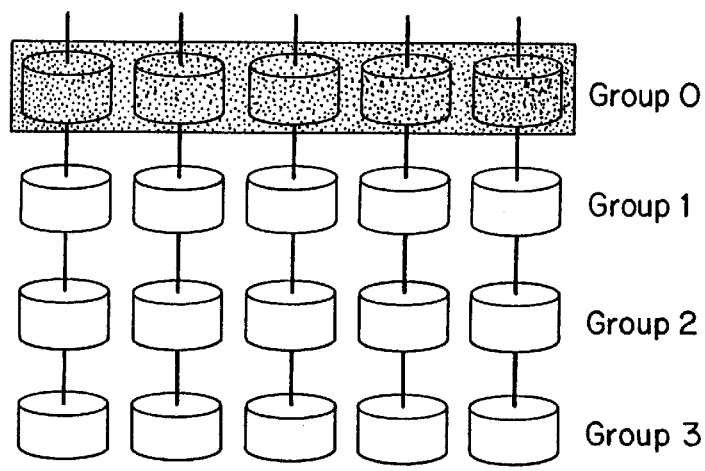
FIG. 22 shows a code being set based on the RAID System condition.
FIG. 23 shows a RAID Level.
FIG. 24 shows a Group conceptional view of the RAID System.
Figures 25, 26:
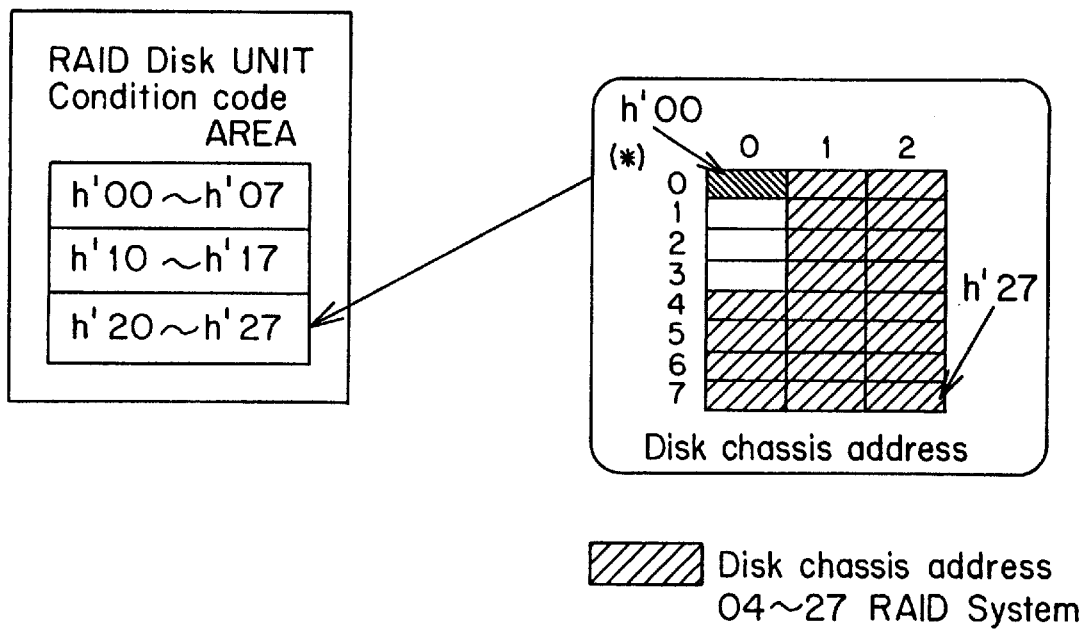
FIG. 25 shows a relationship between a Disk chassis address and the RAID System.
FIG. 26 shows a condition code of a RAID Disk.

For the status table stored in the SRAM of the disk manager 1, a Disk UNIT Information as shown in FIG. 18, described later, a RAID configuration information as shown in FIG. 20 and temperature information are transmitted by the Serial BUS 14. The disk manager 1 writes such information in the status table. Further, via the RS Port 13, the operation information of the RAID System as shown in FIG. 22, described later, and a RAID level information as shown in FIG. 23 are transferred to the disk manager 1. The operation information connected to the RAID System as shown in FIG. 26 are transferred to the disk manager 1 in accordance with the data structure of FIG. 25. The disk manager 1 writes such information on the status table. Further, for an inquiry from the HOST system 2, the disk manager 1 extracts necessary information among the above written information, writes the extracted information on the LED set Information and transfers the LED set information to the HOST system 2 through the SCSI BUS 12.

The status table can be stored on the SRAM separately from the SCSI Block, with a data structure as shown in FIG. 16. By being pointed from the pointer information of the SCSI Block, the status table can be kept in the SCSI Block.

Hereinafter, there is shown the contents of data from the Block Address 0.

The block of Block Address 0 is Read only. The block of Block Address 0 stores information of each of the disk enclosures 6 and the fan unit 5 connected to the data storage system. It is not ensured that information of each unit is not the one right after issuing of the command because there is some time lag.

FIG. 17 shows an image of the block of Block Address 0. "Disk Unit Information Area (48 byte)" sets the disk unit information shown in FIG. 18 for each unit mounted in the disk chassis 7 in order of the Disk chassis address. The Disk chassis address is set as shown in the image view of the Block Address 0 on the right side of FIG. 17.

FIG. 17 shows a disk chassis having 3 slots in width and 8 slots in depth. When there is a unit mounted in each slot, codes are set in turn from the left side below to the end. Namely, the 0th column is shown as "h' 00", "h' 01". . . and codes are being set from the top of the left side to the end of the right side, which is shown as "h' 27". In accordance with the condition of each unit, one of six kinds of codes as shown in FIG. 18 are for each field of the "Disk Unit Information Area (48 byte)".

"FAN Unit Information (2 byte)" of FIG. 17 shows a condition of the fan unit 5 mounted in the disk chassis 7. FIG. 19 shows codes corresponding to the conditions of the fan unit 5. There are two types of codes, one indicating a normally condition and one indicating a fault condition.

"Disk chassis Thermometer (2 byte)" shows a temperature of the thermometer mounted in the disk chassis 7 (the unit is centigrade). The detectable range is from 0 centigrade to 99 centigrade.

"RAID FLG (2 byte)" of FIG. 17 shows whether RAID exists in the data storage system. FIG. 20 shows codes of the RAID configuration. There are two kinds of codes. One shows a case where the RAID system is implemented ("01") and the other shows a case where it is not implemented ("02")

Next, the block of Block Address 1 (Read only) will now be shown.

Figure 21:
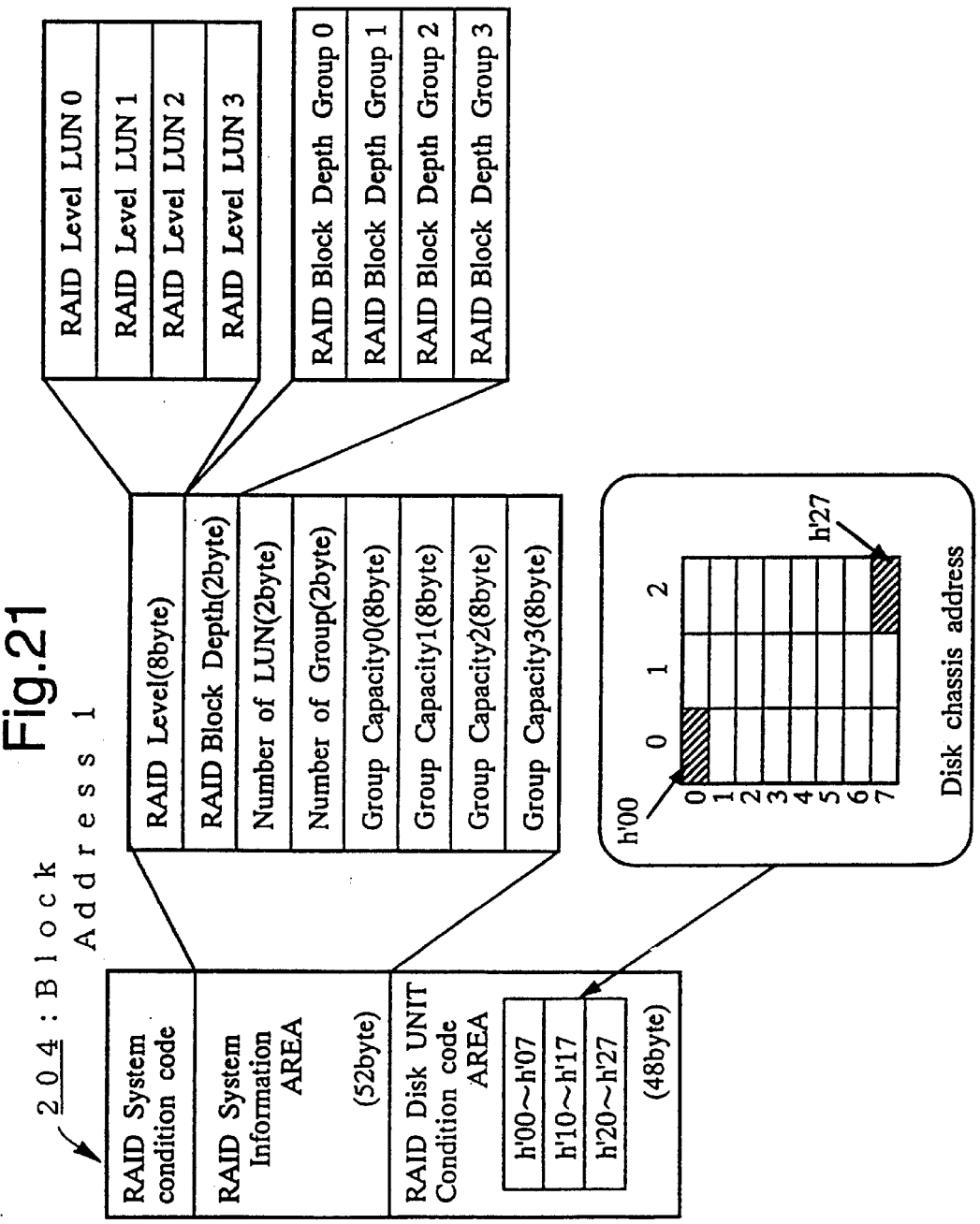
FIG. 21 shows an image of a Block Address 1.

The Block Address 1 is effective in a case where RAID FLG of the Block Address 0=01 (when the RAID System exists), and it stores various kinds of data of the RAID System. When RAID FLG of the Block Address 0=02 and the Block Address 1 is read, Space codes of ASCII are all read. FIG. 21 shows an image view of the block of Block Address 1. "RAID System condition code (2 byte)" shows the condition of the RAID System. FIG. 22 shows a code set of "RAID system condition code (2 byte)" according to the RAID system condition. There are four kinds of codes.

"RAID Level (8 byte)" of "RAID Block System Information AREA (52 byte)" of FIG. 21 shows a RAID Level of each Logical Unit No (LUN). FIG. 23 shows a code for RAID Level. The code of RAID Level is "1","3" or "5".

"RAID Depth (2 byte)" of FIG. 21 shows a RAID Block Depth of each LUN.

One of Depths from "1" to "4" is set. Depth gets deeper from "1" towards "4".

"Number of LUN (2 byte)" of FIG. 21 shows a Logical Unit Number in the whole RAID System. "Number of Group (2 byte)" of FIG. 21 shows a physical number of Groups in the whole RAID System. FIG. 24 shows a conceptional view of a group of the RAID System. In FIG. 24, if five units in a level direction are assumed to be one group, there are-four groups: Groups 0 to 3.

"Group capacity 0 (8 byte) to 3 (8 byte)" of FIG. 21 respectively shows a Disk Capacities Group 0 to Group 3 in the RAID System. It is assumed that 512 bytes is assigned per 1 block. Then, the total number of blocks of each of four groups is set, respectively.

"RAID Disk Unit condition AREA (48 byte)" of FIG. 21 shows a condition of a Disk Unit connected to the RAID control board.

Figure 27:
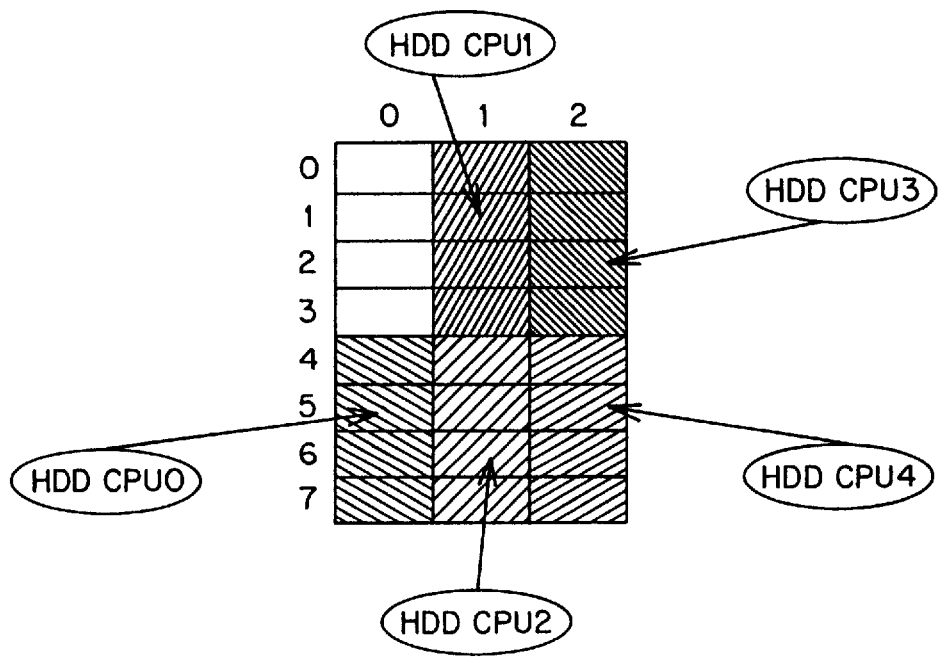
FIG. 27 shows a relationship between the Disk chassis and a Disk Address in a RAID control Board.

The Disk chassis Addresses of the Disk Units connected to RAID are assumed to be 04 to 27 in this embodiment, FIG. 25 shows a relationship between the Disk chassis Address and the RAID System. A condition code of each Disk Unit is described in 2 Byte ASCII code and is classified as shown in FIG. 26 based on the condition of the Disk Unit. There are six kinds of codes. A relationship between the Disk chassis Address and the Disk Address in a RAID control Board is described in FIG. 27. In FIG. 27, h' 04 to h' 07 are disks for CPU 0. h' 10 to h' 13 are for CPU 1 and h' 14 to h' 17 are for CPU 2. In addition, h' 20 to h' 23 are for CPU 3 and h' 24 to h' 27 are for CPU 4. Thus, one RAID System can be used for five CPUs.

A block of Block Address 2 (read only) will now be described.

The block of Block Address 2 stores an execution result of a command set in a Write Block of Block Address 8. In each command, the contents of the COMMAND Results Area (See, FIG. 28) differs and therefore the contents will be shown in detail in case of describing the Write Block later.

FIG. 28 shows an image of the block of Block Address 2. The disk manager control software in the host system confirms a completion of the command by polling this block.

Since it is possible to execute two commands simultaneously, it is necessary to Judge if it is an objective command, by referring to a COMMAND Code.

Next, blocks of Block Addresses 3 to 7 (read only) will be explained.

As mentioned above, when the RAID FLG of the Block Address 0=01 (RAID System exists), the Block Address 1 is effective and stores the error information of the RAID System in occurrence order. The error information is data of 22 bytes as shown in FIG. 29. The error information is consecutively stored in Block Addresses 3 to 7. When 5 blocks are all filled, information is sequentially rewritten from the oldest error information.

Next, a block of Block Address 8 (write only) will now be described.

The Block Address 8 is used when a command to control the data storage system from the software is set.

Figure 30:
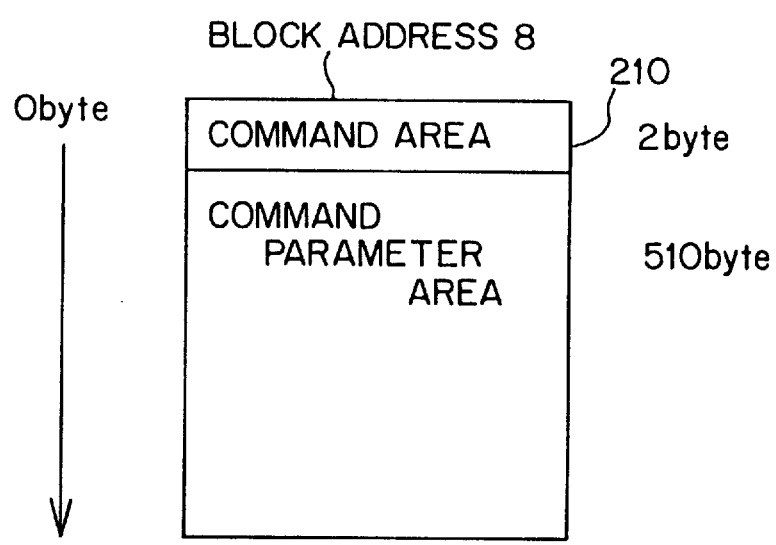
FIG. 30 shows an image of Block Address 8.

FIG. 30 shows an image of the block of Block Address 8. In FIG. 30, the control command is set using the first two bytes. Consecutively, a parameter of 510 bytes is set. Since a format of the COMMAND PARAMETER differs at each control command, the format is described, hereinafter, for each command.

Figure 31:
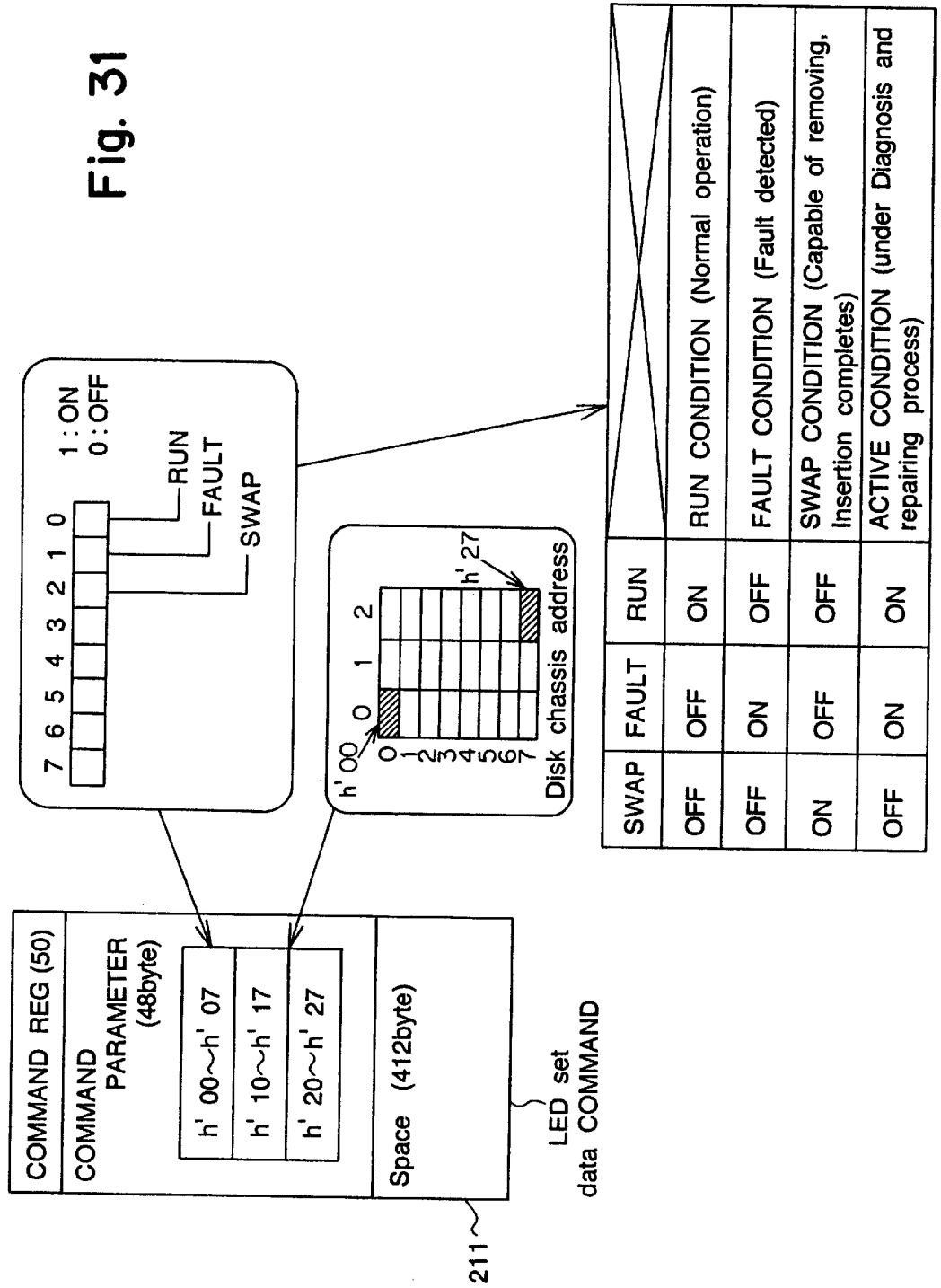
FIG. 31 shows a data set information of an LED.
Figure 32:
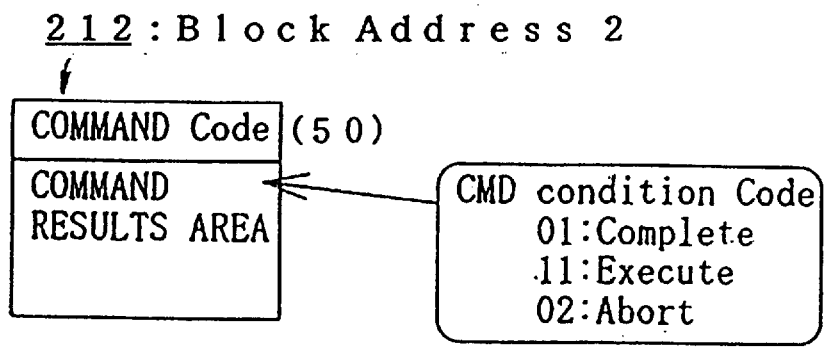
FIG. 32 shows a set data Command of the LED.

"LED set data COMMAND" is a code "50" and the command area of FIG. 30 is set to "50". The COMMAND format, by which the LED of the data storage system is concentratedly controlled, is described in FIG. 31. At each chassis address, the 2 byte of ASCII code for setting data set information of the LED is set. In FIG. 31, data set information of the LED shows three LED conditions of "SWAP", "FAULT" and "RUN". For instance, under "RUN condition", the LEDs for "SWAP" and "FAULT" is turned off and only the LED for "RUN" is turned on. Such condition is shown in 3 bits. In each bit, "1" means ON and "0" means OFF. The remaining area of 512 byte are filled by Space codes. FIG. 32 shows a response stored at Block Address 2 when an execution result of the LED set data Command is set at Block Address 2. In accordance with FIG. 32, responses to be set at Block Address 2 are classified into three types.

Figure 33:
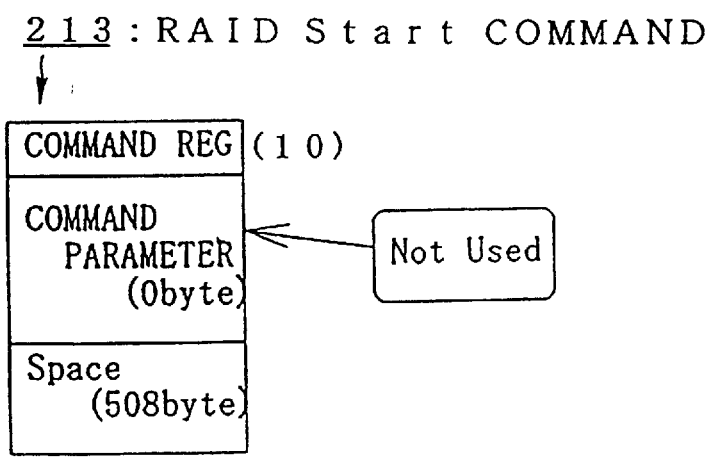
FIG. 33 shows an image of a RAID Start CMD.
Figure 34:
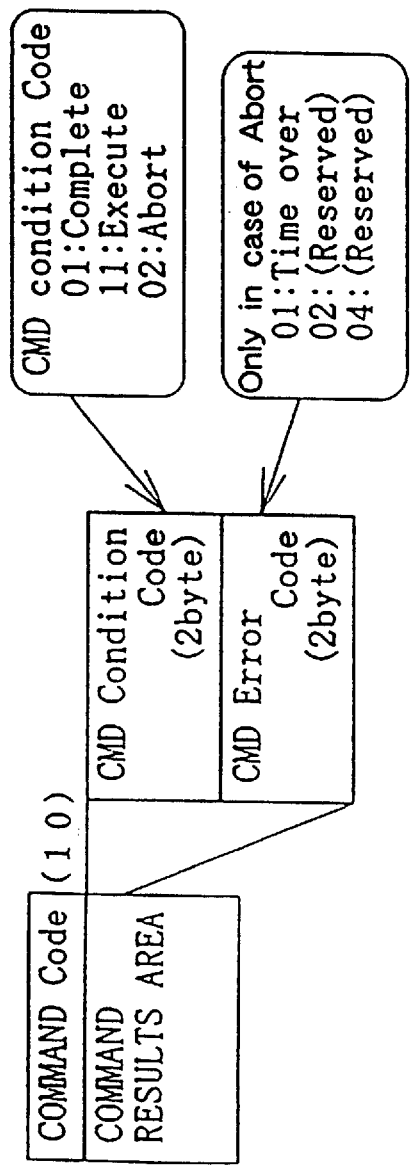
FIG. 34 shows a response to a RAID System Start CMD.

"RAID System Start COMMAND" has a Code "10" and a command area of FIG. 30 is set to "10". The command is effective when RAID is configured in the data storage system. The command starts the RAID System. Ordinarily, since the RAID System is automatically started by applying a power source, a RAID System Start COMMAND is not used. FIG. 33 shows an image of the RAID Start COMMAND. Since this command is recognized only by the value of the command area, a COMMAND PARAMETER is not used. FIG. 34 shows a response stored at Block Address 2 when an execution result of the RAID System Start COMMAND is set at the Block Address 2. In accordance with FIG. 34, responses to be set at Block Address 2 are classified into three types. Only when "CMD Condition Code" is "02 (Abort)", a code is set in "CMD Error Code".

Figure 35:
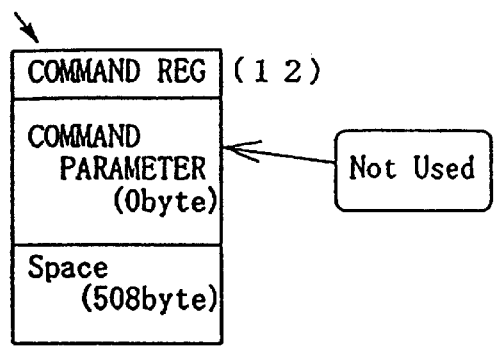
FIG. 35 shows an image of a RAID Stop CMD.
Figure 36:
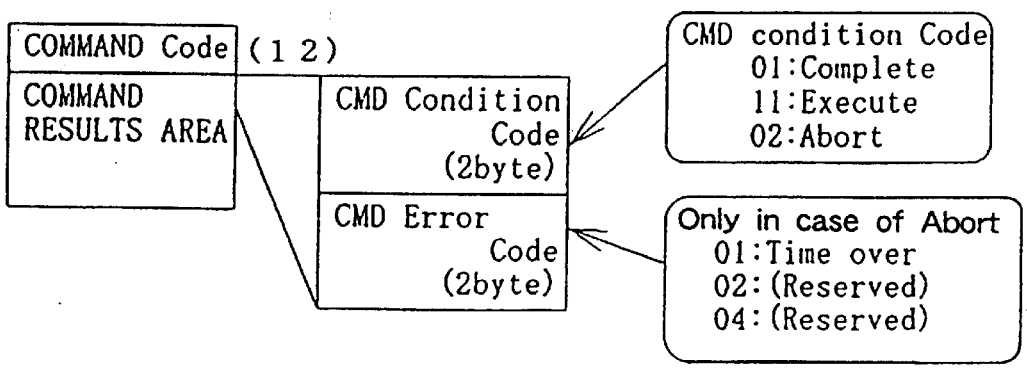
FIG. 36 shows a response to a RAID System Stop CMD.

"RAID System Stop COMMAND" has Code "12" and the command area of FIG. 30 is set to "12". The command is effective when RAID is configured in the data storage system. The command stops the RAID System. FIG. 35 shows an image of a RAID Stop COMMAND. Since the command is recognized only by the value of the command area, the COMMAND PARAMETER is not used. FIG. 36 shows a response stored at Block Address 2 when an execution result of the RAID System Stop COMMAND is set at the Block Address 2. In accordance with FIG. 36, responses to be set at the Block Address 2 are classified into three types. When "CMD Condition Code" is "02 (Abort)", a code is set in "CMD Error Code".

Figures 37, 38:
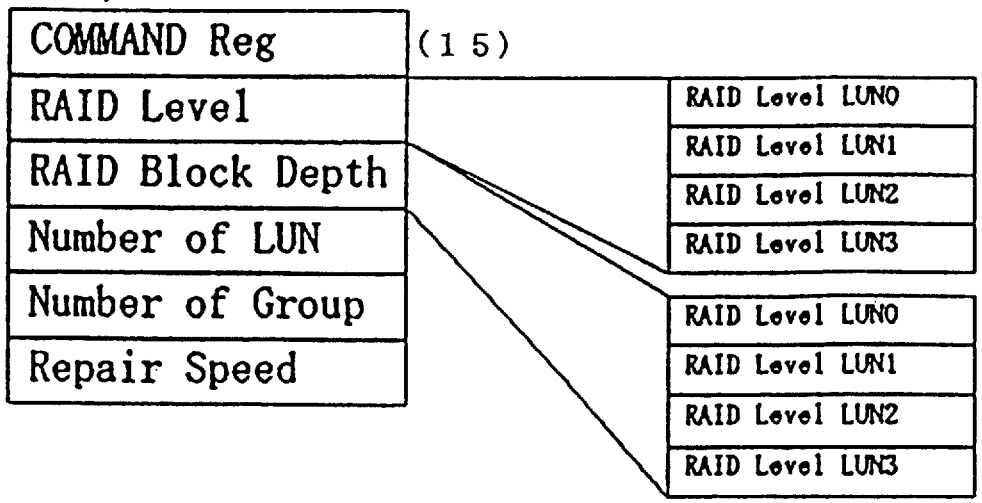
FIG. 37 shows an image of a RAID configuration set CMD.
FIG. 38 shows a value set in the RAID Level.

"RAID Configuration Set COMMAND" has a code "15" and the command area of FIG. 30 is set to "15". The command is effective when RAID is configured in the data storage system. The command sets the initialization information of the RAID System. This is the RAID configuration information mentioned before. On the SRAM of the disk manager, with a similar image of FIG. 37 expecting COMMAND Reg, the RAID configuration information can exist separately from the SCSI Block. Or, it is possible to point the corresponding SCSI Block to the RAID configuration information in the SRAM by storing Just a pointer information in the SCSI Block. FIG. 37 shows an image of a RAID Configuration Set COMMAND. In "RAID Level" and "RAID Block Depth" of this command, the value is set for each logical Unit No. FIG. 38 shows the value set at RAID Level. RAID Level has three values "1", "3" and "5". Because "RAID Block Depth" has two bytes for each LUN and four LUNs are provided in all, the "RAID Block Depth" has eight bytes. For each LUN, the number of blocks per one RAID Block is set at "RAID Block Depth".

"Number of LUN" are 2 bytes. Within a range of "1" to "4", a Logical Unit Number (LUN) is set at "Number of LUN".

"Number of Group" are 2 bytes. Within a range of "1" to "4", a physical number of RAID Groups is set at "Number of Group".

"Repair Speed" are 2 bytes. Within a range of "1" to "10", speed for repairing data is set at "Repair Speed". Speed changes from FAST to LOW, based on values from "1" to "10".

Figure 39:
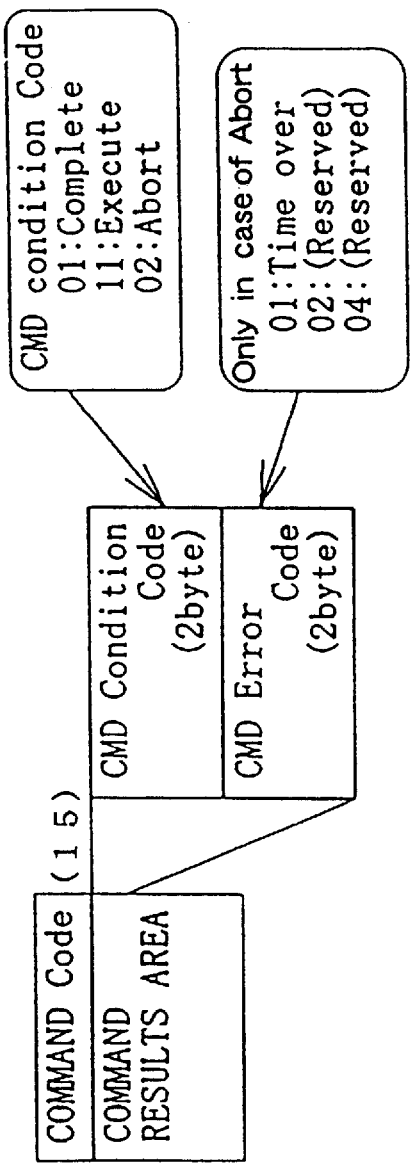
FIG. 39 shows a response to a RAID configuration CMD.

FIG. 39 shows a response stored at the Block Address 2 when an execution result of the RAID Configuration Set Command is set at the Block Address 2. In accordance with FIG. 39, responses to be set are classified into three types. When "CMD condition code" is "02" (Abort), a code is set in "CMD Error Code".

Figure 40:
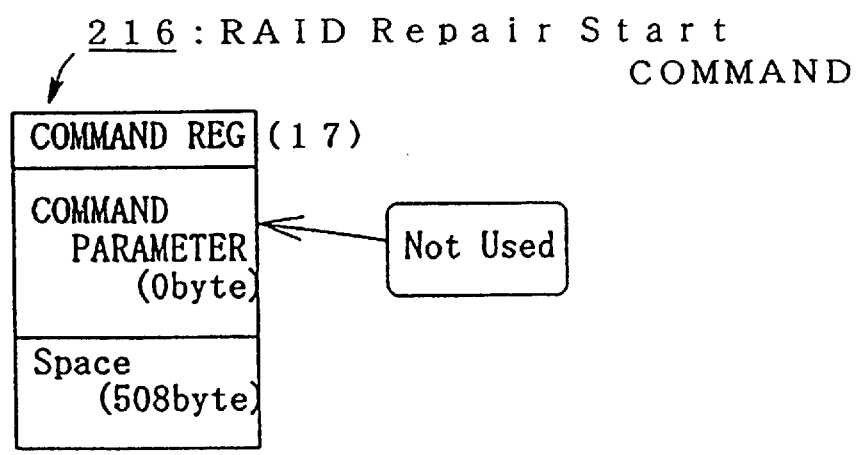
FIG. 40 shows an image of a RAID Repair Start CMD.
Figure 41:
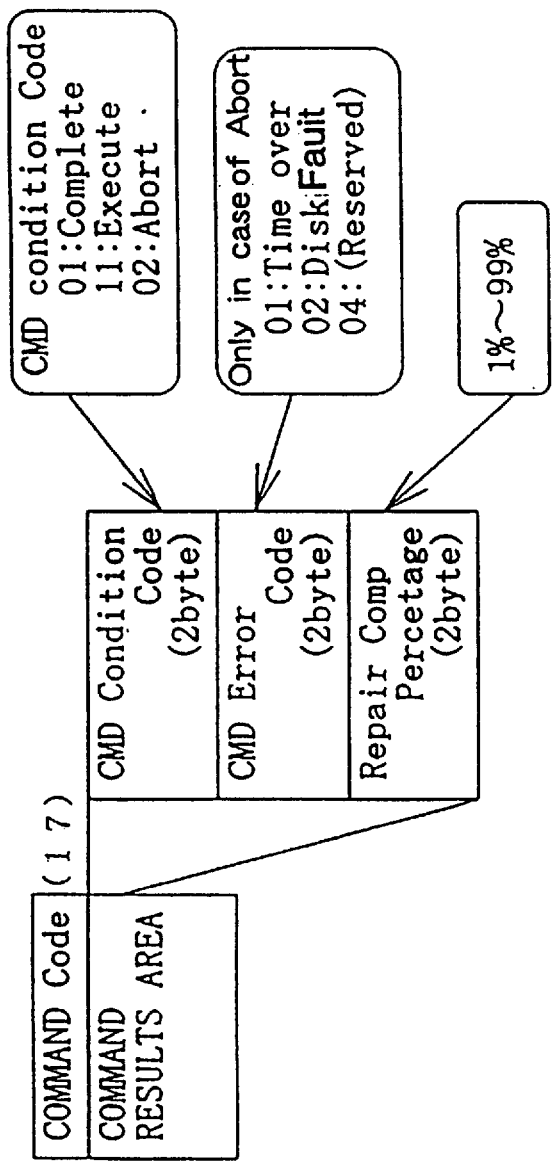
FIG. 41 shows a response to a RAID Repair Start CMD.

"RAID Repair Start COMMAND" has a Code "17" and the command area of FIG. 30 is set to "17". The command is effective when RAID is configured in the data storage system. After the faulty Disk Unit is exchanged, the repairing operation is started by this command. FIG. 40 shows an image of the RAID Repair Start COMMAND. Because the command is recognized only by the value of the command area, a COMMAND PARAMETER is not used. FIG. 41 shows a response stored at the Block Address 2 when an execution result of the RAID Repair Start Command is set at the Block Address 2. In accordance with FIG. 41, responses to be set at the Block Address 2 are classified into three types. Only when "CMD Condition Code" is "02 (Abort)", a code is set in "CMD Error Code". The value set at "Repair Comp Percentage" is 1% to 99% and the disk manager 1 monitors the procedure of the repairing condition.

A Block Address 9 is a spare and not especially used in this embodiment.

Next, a specification of the RS Port is explained.

Figure 42:
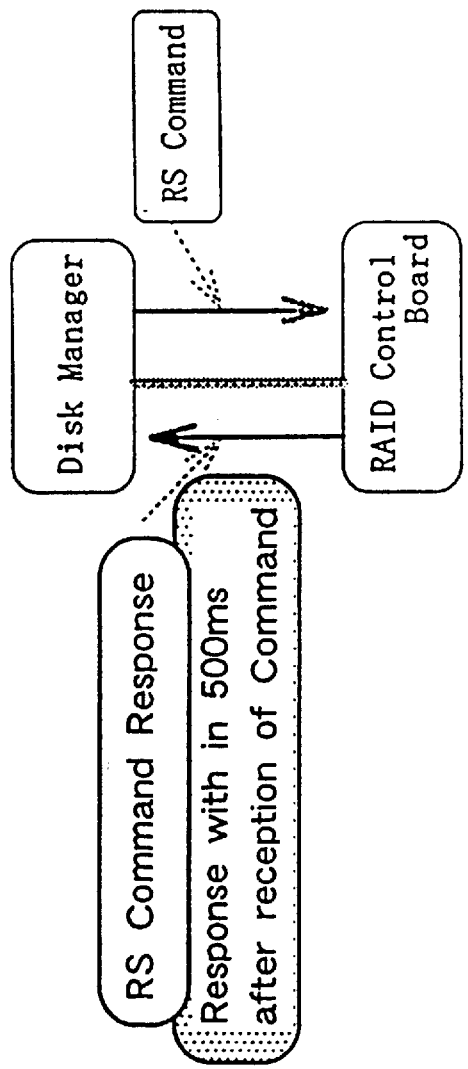
FIG. 42 shows a transmitting and receiving condition of a RS Command.

Via the RS Port, a command is transmitted from the disk manager 1 to the RAID Control Board, which is the disk control unit 3. The RAID Control Board responds to the command. A response of the RAID Control Board is returned for each command from the disk manager 1. The next command is not transmitted before Time out of the command response. When there is no response within 500 ms after the command transmission, the RAID System is determined to be Hung up. The command and the command response needs to be followed by Carriage Return (CR)+ Line Field (LF). The RS Port executes data transmission by using the ASCCI code. FIG. 42 shows a transmitting and receiving condition of the RS Command.

RS Commands will now be explained.

FIG. 43 shows a specification of the RS Commands.

A function of the command "RAID alive" is to confirm the RAID control board connection. As a response to this command, the ID of a connected RAID Board is returned. When there is no response within 500 ms after the command transmission, it is judged that the RAID board is not connected.

A function of the command "Start UNIT" is to activate a start sequence of the RAID system. As a response to this command, information that a start operation of the RAID System is activated, or information that a start operation of the RAID System cannot be activated and the ID of the RAID board are returned.

A function of the command "Stop UNIT" is to activate a stop sequence of the RAID system. As a response to this command, information that a RAID System stop operation is activated, or information that the RAID System stop operation cannot be activated, and the ID of the RAID board are returned.

A function of the command "RAID Ready chk" is to report the RAID System condition. As a response to the command, information of "RAID System Ready", information of "RAID System Ready under the degenerate operation", or information of "RAID System Fail", and the ID of the RAID board are returned.

Figure 44:
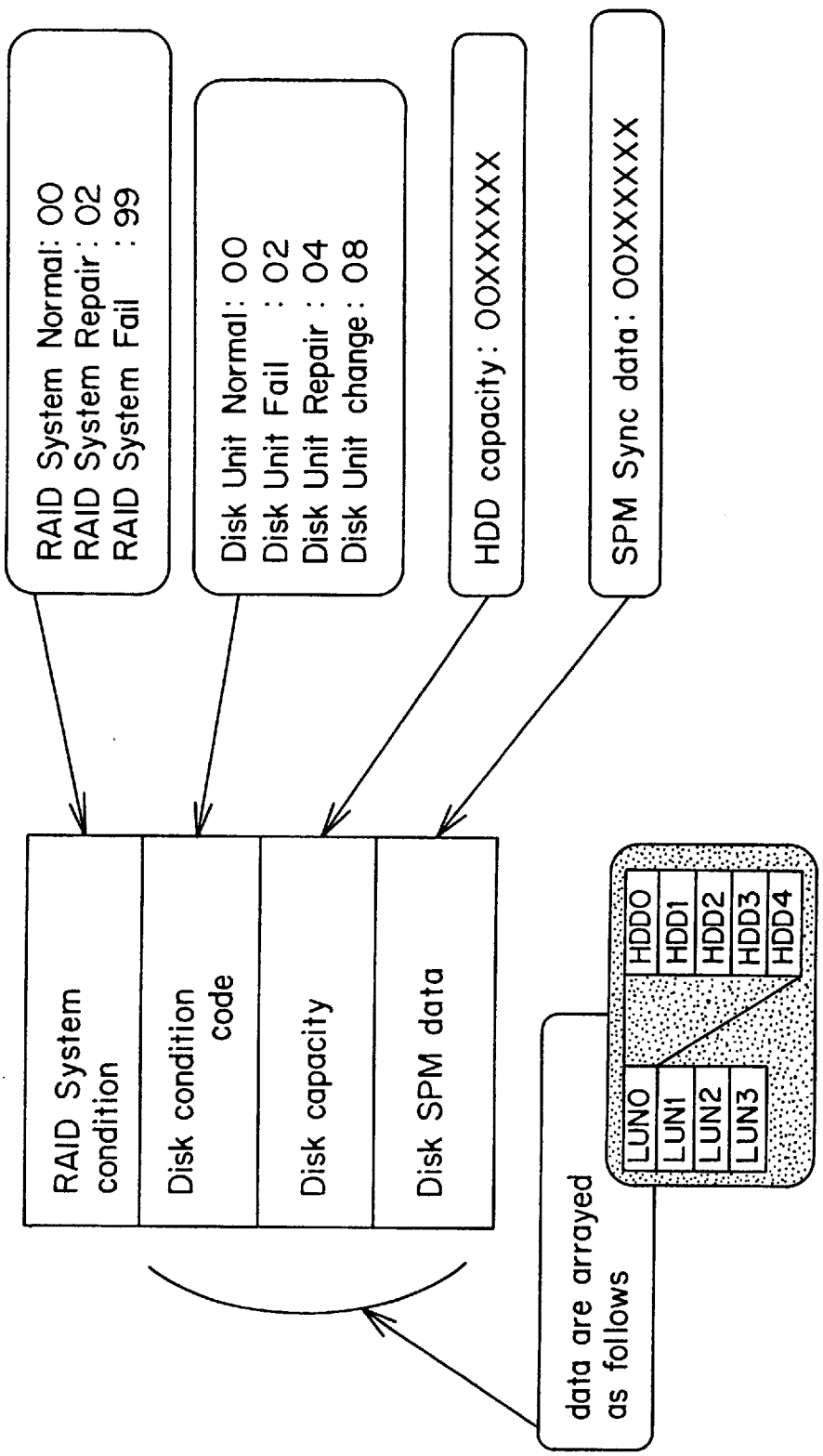
FIG. 44 shows a RAID information read data string, one of the RS Command.

A function of the command "RAID information read" dumps each kind of RAID information. As a response to this command, information of data strings of FIG. 44 and the ID of the RAID board are returned.

Figure 45:
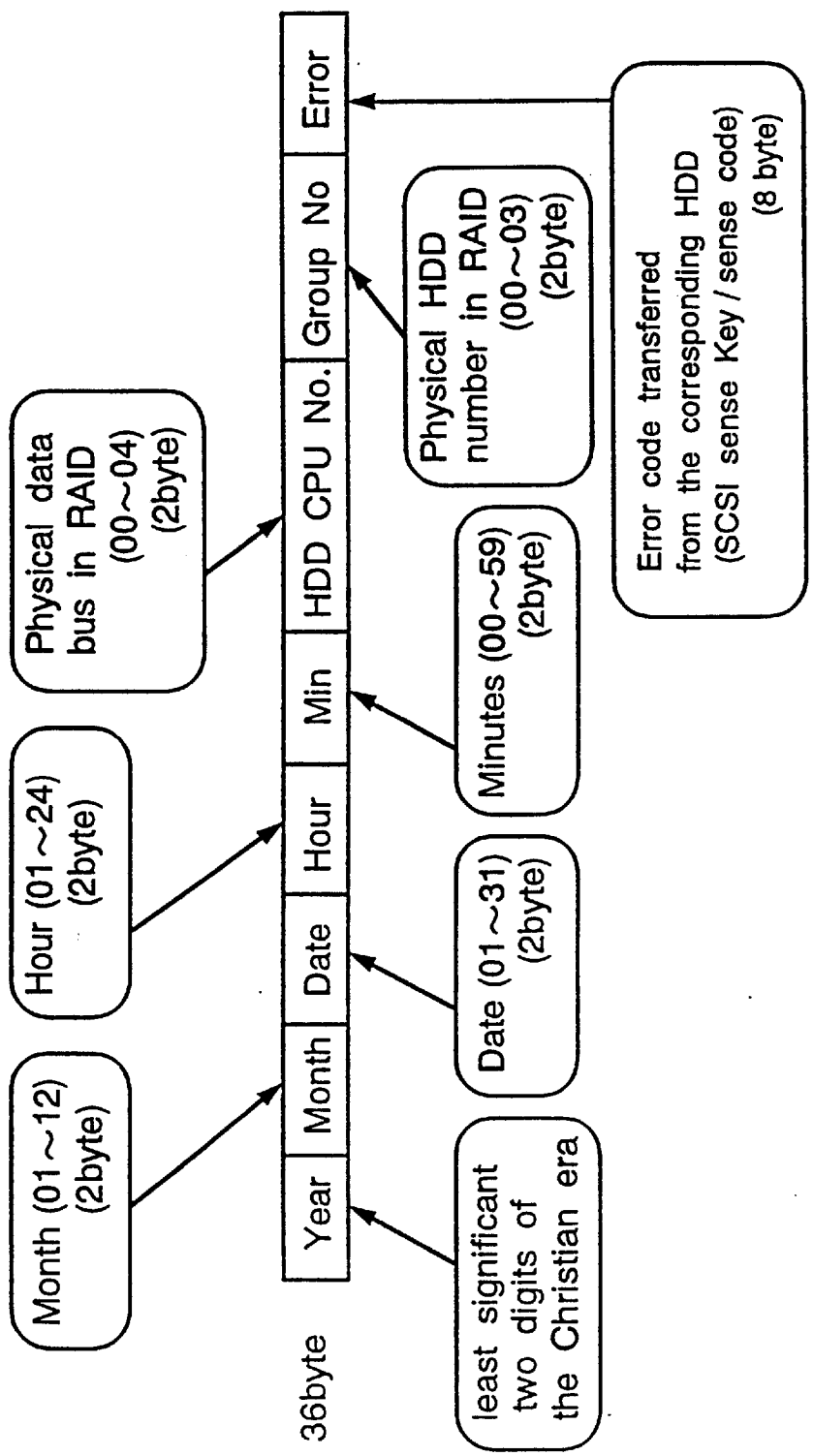
FIG. 45 shows a RAID error information.

A function of the command "RAID Error Dump" is to dump the RAID error information. A response to the command is an error information of FIG. 45. In accordance with FIG. 45, error information of 36 bytes per one error is returned. A maximum number of errors to be dumped is 70.

Next, a specification of the Serial BUS is explained.

The Serial bus connects the disk manager 1 and each Unit in the data storage system 8 via a mother board. The Serial bus is used for dumping of information of each Unit (such as DC power source condition, Swap SW ON/OFF and Device Type, LED control connected in each Unit of each Disk and the condition of FAN Unit).

Figure 46:
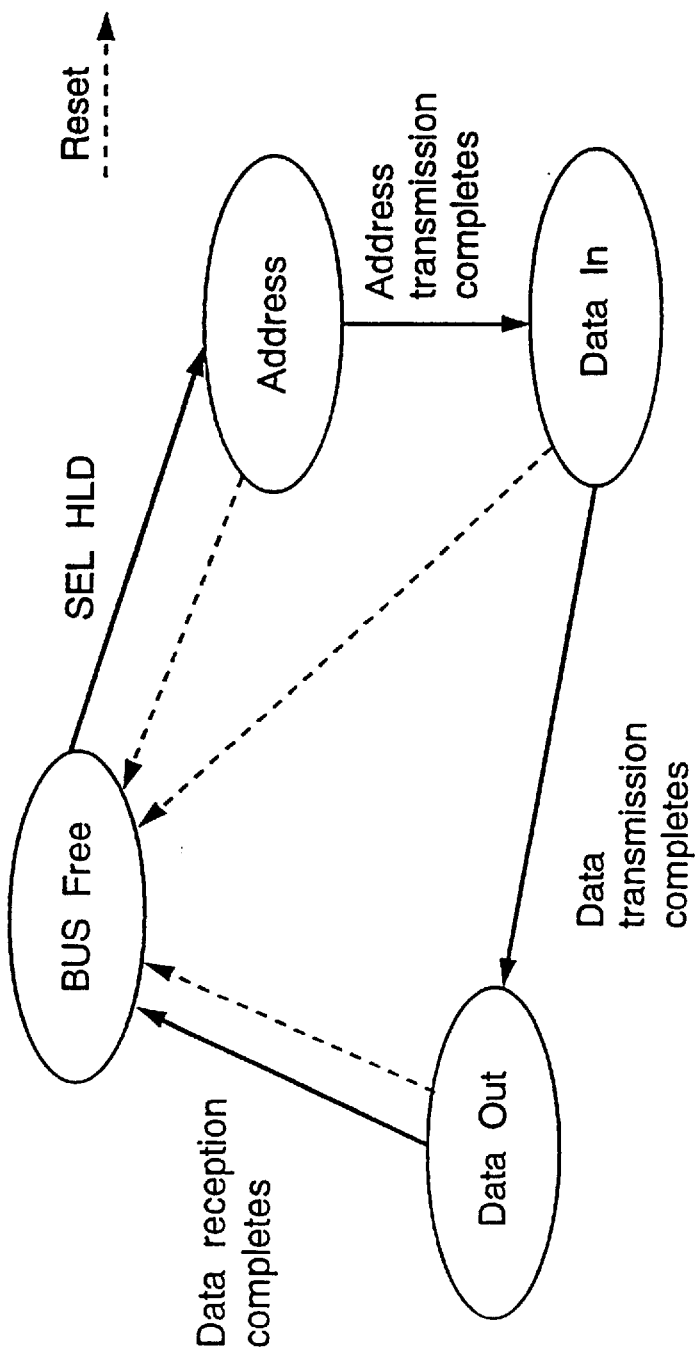
FIG. 46 shows a transition diagram of a Serial BUS.

As in above mentioned FIG. 7, the Serial BUS is composed of four signals, SEL-HLD, IF-CLK, DATA-IN and DATA-OUT. The SEL-HLD signal can serve as a Reset signal. FIG. 46 shows a transition diagram of the condition of the Serial BUS. The Serial BUS operates based on the IF-CLK output from the disk manager 1. In accordance with FIG. 46, the Serial BUS phases has four phases. Bus Free phase is a phase wherein the Serial Bus is available. Address phase is a phase wherein the Serial Bus transmits an address of a unit. Data IN phase is a phase wherein the Serial Bus transmits register data to the unit from the disk manager 1. Data OUT phase is a phase wherein the Serial Bus transmits register data from the unit to the disk manager 1. When Reset is released and the SEL-HLD signal is Hi, the phase moves from the BUS Free phase to the Address phase. A Unit whose Address agrees with an address transmitted moves to the Data IN phase and receives 10 bits of register data from the disk manager 1. After receiving 10 bits of register data, the unit moves from the DATA IN phase to the DATA OUT phase and transmits data. Then, the unit moves from the DATA OUT phase to the BUS Free phase and completes communication. By setting the Reset signal Low, at any phase the phase of the Serial Bus moves to BUS Free phase. FIG. 47 shows the contents of data transferred by the DATA IN/OUT phase.

In a Read Reg of FIG. 47, bits 0 to 3 show Disk Mode. This means that there are a maximum of 4 Modes for one disk. Additionally, by using three bits from bit 0 to bit 2, three LED are turned on and off. When each bit is set "ON" or "OFF", it is possible to realize "RUN condition", "FAULT condition", "SWAP condition" and "ACTIVE condition", as shown in FIG. 47.

Next, a specification of an interface with the FAN Unit is explained.

The interface with the FAN Unit has a Read/Write Reg of 8 bits. Bit allocation of each resister is shown in FIG. 48.

Figures 48, 49:
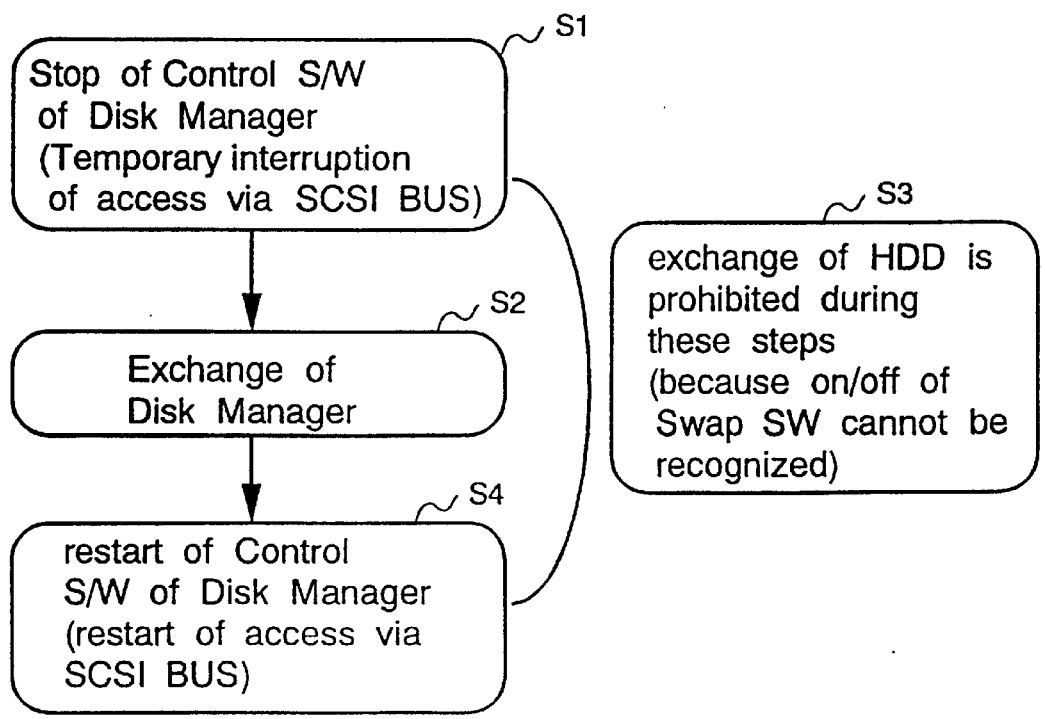
FIG. 48 shows contents of the register configuring a FAN interface.
FIG. 49 shows an exchange procedure of the disk manager.

In accordance with FIG. 48, by turning the LED of the fan unit 5 on and off, it is possible to show the "SWAP", "FAULT", "READY" conditions to the user.

In FIG. 1, the PCI-SCSI 4 has an independent structure from the disk control unit 3. However, the PCI-SCSI 4 can be mounted on the same board with the disk control unit 3. The disk manager 1 then communicates with the HOST system via the PCI-SCSI 4 mounted on the disk control unit 3.

Embodiment 2.

In this embodiment, there is shown an exchange of the disk manager of the data storage system of Embodiment 1.

The disk manager according to this invention is an exchangeable component. However, the disk manager is connected to the SCSI BUS in the RAID System. Therefore, attention should be paid in case of exchanging. At the time of exchanging the disk manager 1, the access to the disk manager 1 of the RAID Control software should be interrupted temporarily from a system console.

FIG. 49 shows an exchange procedure of the disk manager.

In accordance with FIG. 49, the user stops the access to the disk manager 1 of the RAID Control software (S/W) from the system console at S1. Then, the user exchanges the disk manager 1 at S2. Meanwhile, exchange of the Hard Disk Drive (HDD) (or the disk enclosure 6) connected to the data storage system should not be performed. This is because ON/OFF of the Swap SW cannot be confirmed by the stop of the disk manager 1 at S3. When exchange of the disk manager 1 completes, the user recovers the software (S/W) of the disk manager 1 from the system console at step 4. Thus, exchange of the disk manager 1 ends.

Embodiment 3.

In this embodiment, there is shown exchange or addition of the disk enclosure of the data storage system of Embodiment 1.

Exchange of the disk enclosure 6 differs based on the RAID configuration and a non-RAID configuration.

Figure 50:
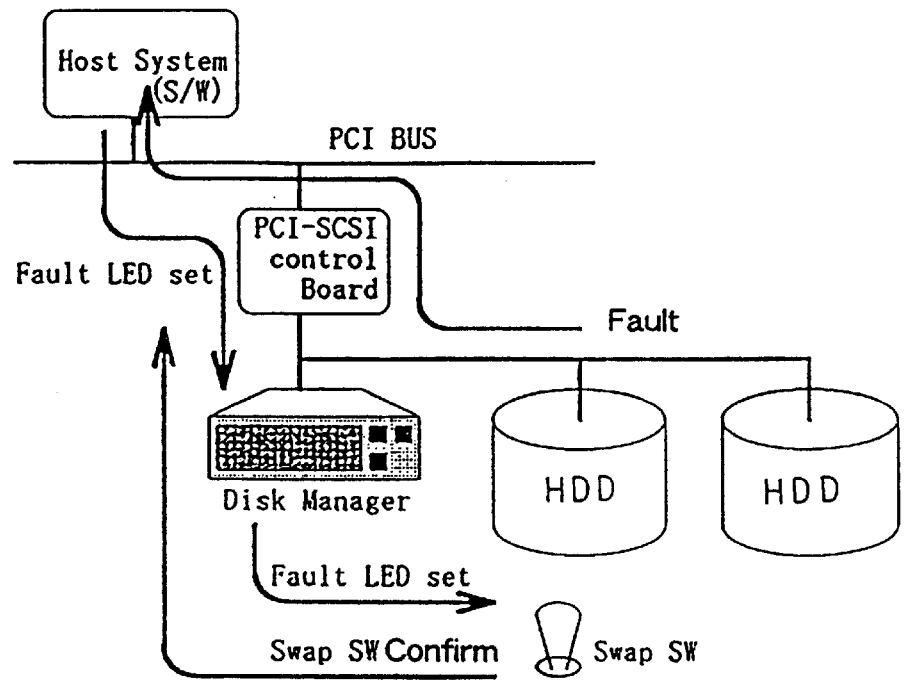
FIG. 50 shows a signal flow in case of exchanging the disk enclosures.
Figure 51:
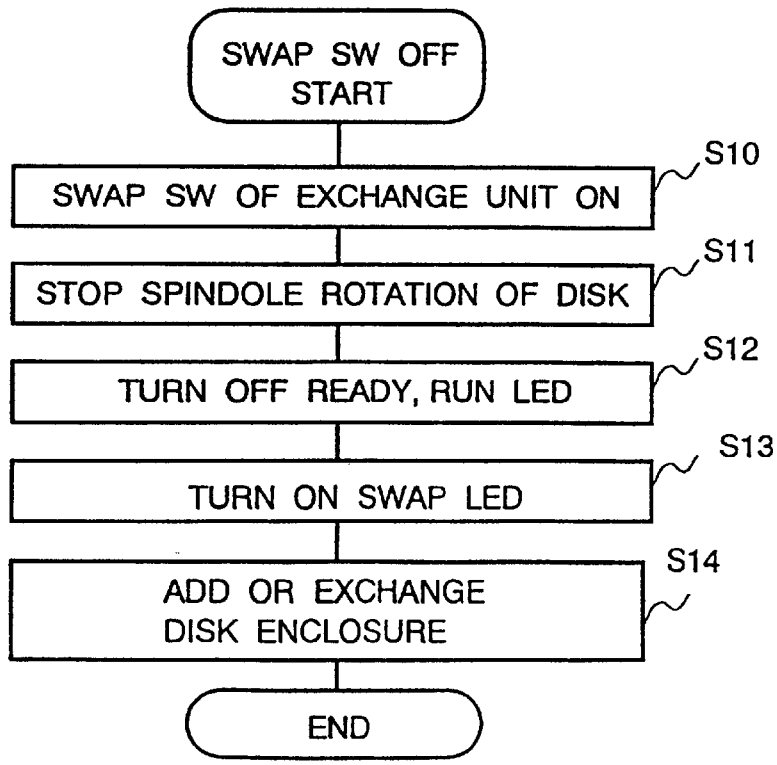
FIG. 51 shows a flow of a procedure of addition and exchange of online of the disk enclosures.
Figure 52:
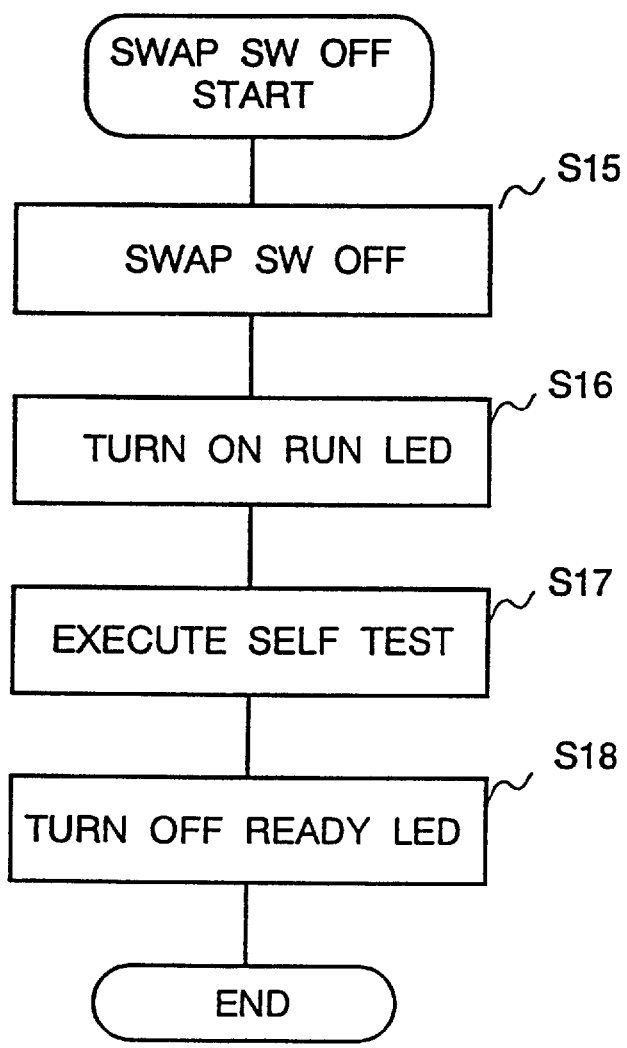
FIG. 52 shows a flow of a procedure of addition and exchange of online of the disk enclosures.

FIG. 50 shows a flow of signals in accordance with exchange or addition of the disk enclosure in case of the non-RAID configuration. FIG. 51 shows a procedure of online addition and online exchange of the disk enclosure. Furthermore, FIG. 52 shows another procedure of online addition and online exchange. In accordance with FIG. 50, in case of the non-RAID configuration, an error report from the HDD connected to the PCI-SCSI 4 is detected by the software of the HOST system 2 and Fault is displayed by the LED via the disk manager 1. When the LED displays the Fault condition, the user turns on the SWAP SW of the unit mounted in the faulty disk enclosure at step S10. Then, processing of the Swap SW of the unit is reported to the HOST system 2 via the disk manager 1. The HOST system 2 stops the Spindle Motor (SPM) of the corresponding HDD at step S11. After that, the READY LED and the RUN LED of the HDD are turned off at step S12 and the SWAP LED is turned on at step S13. Accordingly, via the disk manager 1, the HOST system 2 can indicate that the disk enclosure 6 is exchangeable to the user. The user adds or exchanges the disk enclosure at step S14.

When addition and exchange of the disk enclosure 6 is completed, SWAP SW is turned off at step S15. The turn off of the SWAP SW is detected by the software via the disk manager 1. At this time, the RUN LED is turned on at step S16 and after issuing a START UNIT command, the disk manager 1 executes auto-diagnosis at step S17. After confirming normal completion of the execution, the disk manager 1 turns on the READY LED. Under repairing or recovering condition, the FLT LED is turned to yellow and when repairing or recovering operation completes, the FLT LED is turned off. Such procedure can be monitored by the HOST system 2 via the disk manager 1.

Next, there is shown an explanation of addition or exchange of the disk enclosure in case of the RAID configuration.

Figure 53:
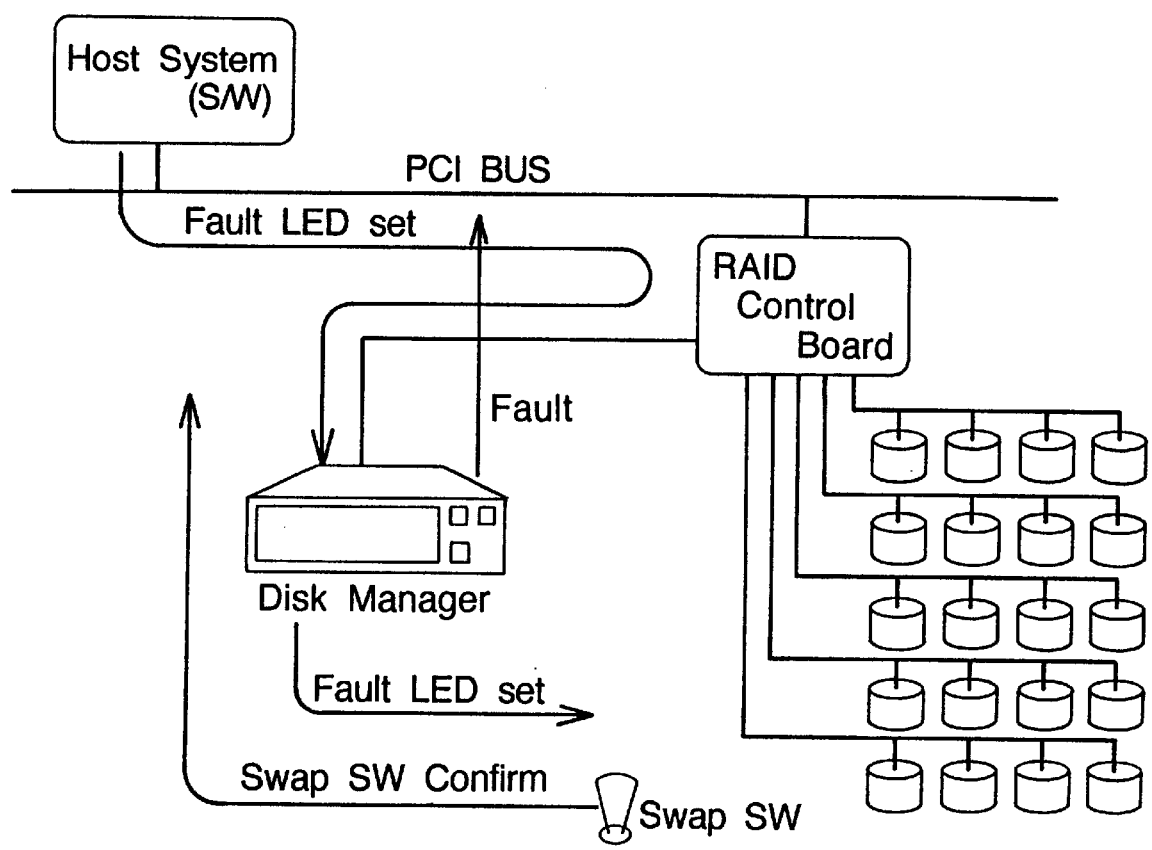
FIG. 53 shows a signal flow in case of exchanging the disk enclosures.

FIG. 53 shows a flow of a signal in accordance with exchange or addition of the disk enclosure in case of the RAID configuration. In accordance with FIG. 53, in case of the RAID configuration, error report is detected by the software of the HOST system 2 via the disk manager 1. Then, Fault of the unit is displayed by the LED mounted in the faulty disk enclosure 6. via the disk manager 1.

Then, pressing of SWAP SW of the unit is reported to the HOST system 2 via the disk manager 1. Stop of the SPM is performed not by the HOST system 2 but by the judgement of the RAID Control Board.

The HOST system 2 indicates, via the disk manager 1, that exchange operation is possible by using the LED display.

Embodiment 4.

Figure 54:
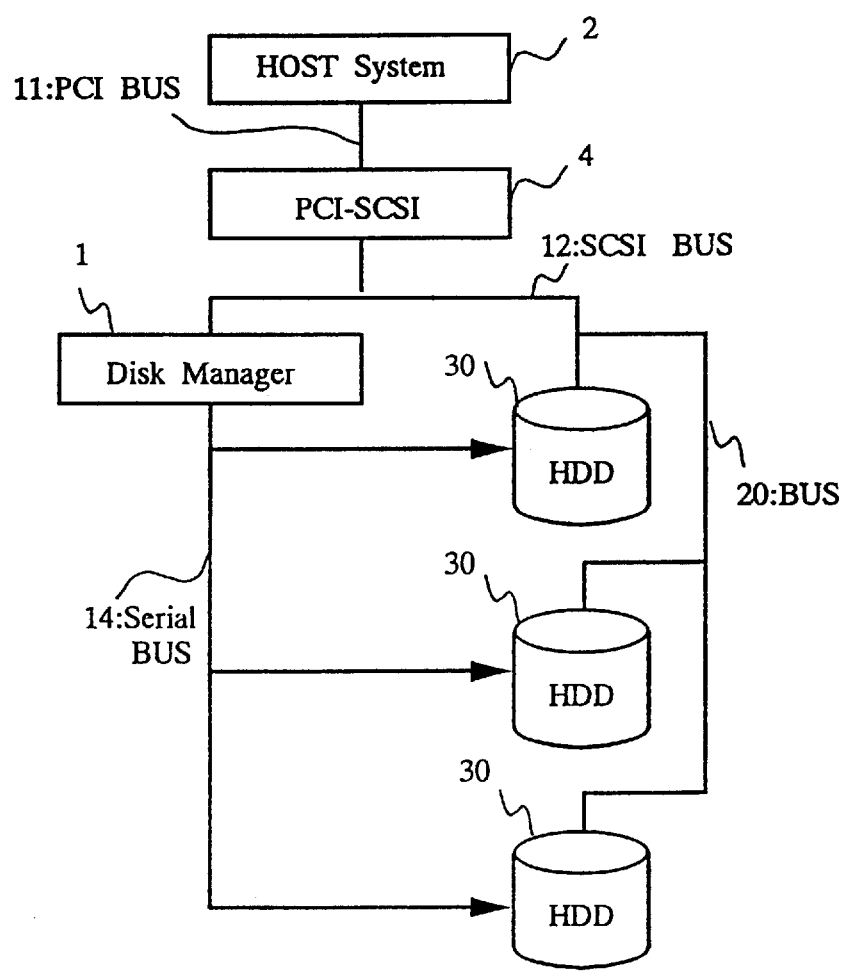
FIG. 54 shows a System configuration of an example of the data storage system; and, FIG. 55 shows a block diagram of an example of a conventional arrayed disk drive mechanism system.
Figure 55:
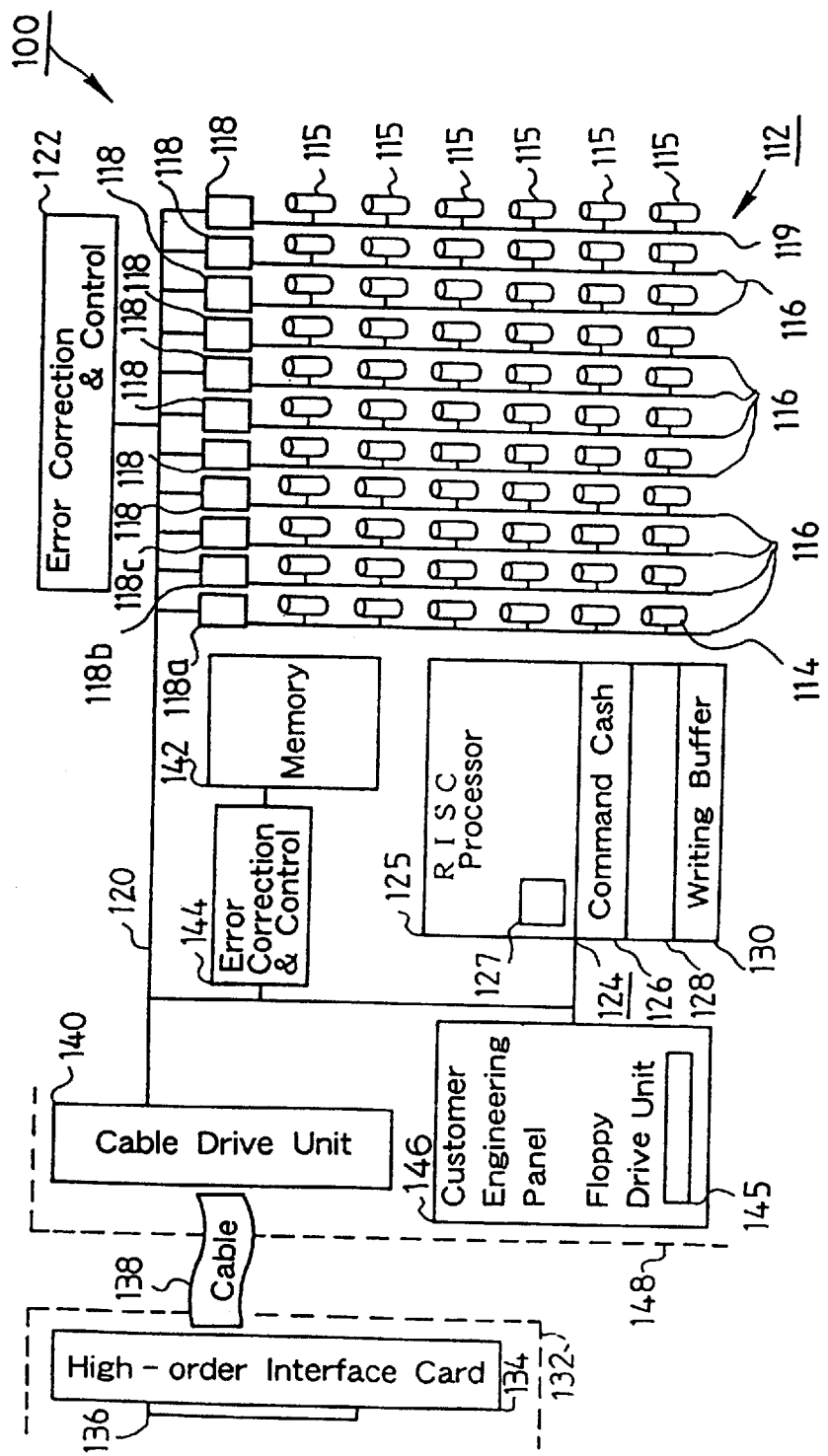

In the Embodiment 1, the RAID system is connected to the data storage system. However, as shown in FIG. 54, without using the RAID system, it is possible to connect the disk manager 1 and HDDs 30 for storing data by the SCSI BUS 12 and the Serial BUS 14.

In the Embodiment 1, the HOST system 2 and the data storage system 8 are connected by the PCI BUS 11. Instead of the PCI BUS 11, any other kind of BUS can be employed. In case of using other kind of BUS, instead of the PCI-SCSI 4, a data convertor is needed to convert the corresponding BUS data to the SCSI BUS data.

As has been described, when the data storage system of Embodiments 1 to 4 are used, the following actions and effects can be obtained.

Also, based on a specification of the SCSI BUS, the RS Port, the Serial Bus connecting the disk manager 1, the disk control unit 3, the fan unit 5, the disk enclosures 6 and the disk chassis 7, the followings can be easily realized.

(1) The disk manager and the disk control unit can communicate with the HOST system through the SCSI BUS. The disk manager and the disk enclosures can communicate through the Serial BUS. Further, the disk control unit and the disk manager can communicate through the RS Port, which is one type of Serial BUS. Then, the disk manager controls and monitors each disk enclosure. The dism manager can control the disk enclosures through the disk control unit. Accordingly, the HOST system controls the disk enclosure via the disk manager. Therefore, direct control of the operation of the disclosure is not needed and a load of the HOST system can be reduced.

Furthermore, a load of the data transmission bus can be reduced.

Furthermore, when there occurs a fault in the disk enclosure or the configuration of RAID is changed, the disk manager collects information of the cases and controls the operation of the disk enclosure properly based on the collected information.

(2) An indicator is provided in the disk enclosure. The disk manager controls the indication of the indicator. Accordingly, based on the operation condition of the disk enclosure collected by the disk manager, it is possible to inform the normal or abnormal operation of the disk enclosure to the user by using the indicator.

(3) Even when a conventionally existing RAID system is connected to the data storage system, the disk manager monitors and controls the condition of the RAID system. Accordingly, when a new data storage system is configured, it is possible to adopt the RAID system easily. Further, when the RAID system is already adopted and the data storage system is configured, it is possible to change the existing data storage system to the data storage system according to this invention.

(4) The disk enclosure is a disk drive to store data. Accordingly, an access method for the disk enclosure from the HOST system is equivalent to an access method for conventional disk drives. Hence, when the data storage system according to this invention is newly connected to the HOST system, it is possible to employ the disk enclosure without changing software of the HOST system.

(5) It is possible that the user mounts the disk manager and the disk enclosures on same shape of any slots provided by the disk chassis. When the disk chassis is used, there are no convexity and concavity of the chassis and the space can be made use of.

(6) The back plane has signal lines to connect the Serial BUS. Accordingly, when the disk enclosures, the disk manager and the fan are mounted in the slots of the disk chassis, they can communicate through the back plane. Further, when the disk enclosure, the disk manager and the fan are mounted in one of the slots, it is possible to communicate among the disk enclosures, the disk manager and the fan without any special wiring operation.

(7) The disk manager has a temperature sensor and detects a temperature in the disk chassis. According to the temperature change, it controls rotation of the fan.

(8) The information collected by the disk manager is stored in a non-volatile memory contained within the disk manager. Accordingly, even when the power source is cut off, the above information will not be lost. Further, in order to confirm the information, the user outputs it as a dump. The user may keep this information as historical information.

(8) By using the indicator and the input part of the disk manager, the user can request the operation to the disk manager. Accordingly, when fault occurs in the data storage system or when the apparatus configuration of the data storage system is changed, the user can request such operation easily to the disk manager.

(9) The HOST system identifies the disk manager and the disk control unit by the SCSI-ID.

(10) The disk manager exchanges information with the HOST system based on the storage managing method. Accordingly, the monitoring information of the disk enclosures monitored by the disk manager can be transferred to the HOST system. For instance, when there occurs a fault in the disk enclosures, the HOST system can know the occurrence through the disk manager.

(11) The disk manager exchanges the information with the disk control unit based on the storage managing method. Accordingly, the disk manager can know the operation of the disk enclosures through the disk control unit. The similar procedures can be realized in the HOST system because the host. system exchanges the information with the disk control unit.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A data storage system for coupling to a host system, the data storage system comprising:

(a) a storage unit for storing data having a first interface for coupling to the host system and having a second interface which is different and independent from the first interface;

(b) a storage manager that manages the storage unit having a first interface for coupling to the host system to communicate with the host system and a second interface coupled to the second interface of the storage unit for communicating with the storage unit;

wherein the storage unit includes a plurality of storage enclosures to store data and a storage control unit to control the plurality of storage enclosures, each storage enclosure of the plurality of storage enclosures being coupled to the storage manager through the second interface of the storage unit, and the storage control unit being coupled to the first interface of the storage unit.

2. The data storage system of claim 1 wherein the storage manager monitors an operating condition of each storage enclosure and collects operating information from each storage enclosure and controls the operation of each storage enclosure.

3. The data storage system of claim 2, wherein each of the storage enclosures has an indicator to indicate the operating condition and the storage manager controls an indication of the indicator.

4. The data storage system of claim 2, wherein the storage control unit is a Redundant Array of Inexpensive Disks (RAID) controller.

5. The data storage system of claim 2, wherein each of the storage enclosures has a disk drive to store data.

6. The data storage system of claim 5, wherein the storage manager controls a synchronization of a disk rotation of the disk drive.

7. The data storage system of claim 1 wherein the data storage system further includes a storage chassis having substantially similar shaped slots arranged at least in one dimensional direction, wherein each of the storage enclosures and the storage manager has substantially a same shape such that each of the storage enclosures and the storage manager may be mounted in any of the slots.

8. The data storage system of claim 7, wherein the storage chassis has a back plane accessible from each slot, and wherein the back plane has a signal line to couple the second interface of the storage unit to each of the storage enclosures and to the second interface of the storage manager.

9. The data storage system of claim 8, wherein the data storage system further includes a fan for cooling coupled to the second interface of the storage manager through the second interface of the storage unit.

10. The data storage system of claim 9, wherein the storage chassis further includes a slot to mount the fan, and wherein the back plane has a signal line to couple the fan to the second interface of the storage unit.

11. The data storage system of claim 10, wherein the storage manager has a temperature sensor to detect a temperature in the storage chassis and wherein the storage manager controls rotation of the fan.

12. The data storage system of claim 4, wherein each of the storage manager and the storage control unit further includes a third interface and wherein the third interface of the storage manager is coupled to the third interface of the storage control unit.

13. The data storage system of claim 12, wherein the storage manager monitors an operating condition of the storage control unit, collects operating information from the storage control unit and controls the operation of the storage control unit.

14. The data storage system of claim 13, wherein the storage manager has a non-volatile memory to record the operating information collected by the storage manager.

15. The data storage system of claim 14, wherein the storage manager has an indicator and an input part whereby direct access to the storage manager is provided to a user.

16. The data storage system of claim 1 wherein the first interface of the storage manager and the storage unit is a Small Computer System Interface (SCSI).

17. The data storage system of claim 16, wherein the storage manager and the storage control unit are identified by the host system by using a SCSI-ID.

18. The data storage system of claim 10, wherein the second interface of the storage manager and the storage unit is a serial interface.

19. The data storage system of claim 13, wherein the third interface of the storage manager and the storage unit is a serial interface.

20. A storage managing method of a system having a host system coupled to a data storage system, the data storage system having a storage unit and a storage manager, the method comprising the steps of:

(a) transferring data between the storage unit and the host system through a first communication path coupled to the storage unit, the storage manager and the host system;

(b) transferring managing information between the storage manager and the host system through the first communication path;

(c) monitoring and controlling operation of the storage unit by the storage manager through a second communication path coupled to the storage unit and the storage manager, the second communication path being different and independent from the first communication path;

wherein the storage unit has a plurality of storage enclosures and wherein the step of monitoring and controlling operation of the storage unit further includes step of communicating with each of the plurality of storage enclosures through the second communication path and collecting information from each of the storage enclosures.

21. The storage managing method of claim 20, wherein the storage unit has a storage control unit coupled to the storage manager through a third communication path, and the storage managing method further includes the step of exchanging control information between the storage manager and the storage control unit through the third communication path.

22. A data storage system for providing data storage for a host system, the data storage system comprising:
- a storage unit that stores data of the host system;
- a storage manager that monitors and controls data storage in the storage unit;
- first means for transferring data between the host system, the storage unit and the storage manager;
- second means for transferring data between the storage unit and the storage manager, the data transferred by the second means being related to management information of the storage unit; and
- third means for transferring data between the storage manager and the storage unit, the data transferred by the third means being related to status and control information of the storage unit;
- wherein each of the first means, the second means, and the third means transfers data independent from, and without interfering with data transmission on, each of the other of the first means, the second means and the third means.

* * * * *